US012606655B2

(12) United States Patent
Yang et al.

(10) Patent No.: US 12,606,655 B2
(45) Date of Patent: Apr. 21, 2026

(54) CURABLE RESIN, CURABLE RESIN COMPOSITION, AND CURED PRODUCT

(71) Applicant: DIC Corporation, Tokyo (JP)

(72) Inventors: Lichen Yang, Chiba (JP); Ryuichi Matsuoka, Chiba (JP); Hiroyoshi Kannari, Chiba (JP)

(73) Assignee: DIC Corporation, Tokyo (JP)

( * ) Notice: Subject to any disclaimer, the term of this patent is extended or adjusted under 35 U.S.C. 154(b) by 619 days.

(21) Appl. No.: 18/007,742

(22) PCT Filed: May 20, 2021

(86) PCT No.: PCT/JP2021/019096
§ 371 (c)(1),
(2) Date: Dec. 2, 2022

(87) PCT Pub. No.: WO2021/246182
PCT Pub. Date: Dec. 9, 2021

(65) Prior Publication Data

US 2023/0242691 A1 Aug. 3, 2023

(30) Foreign Application Priority Data

Jun. 3, 2020 (JP) ................................. 2020-097139
Dec. 23, 2020 (JP) ................................. 2020-214257

(51) Int. Cl.
*C08J 5/24* (2006.01)
*C08F 136/22* (2006.01)
(Continued)

(52) U.S. Cl.
CPC ............... *C08F 136/22* (2013.01); *C08J 5/24* (2013.01); *C08L 47/00* (2013.01); *C09D 147/00* (2013.01); *C08J 2347/00* (2013.01)

(58) Field of Classification Search
CPC ........ C08F 136/22; C08J 5/24; C08J 2347/00; C08L 47/00; C09D 147/00
See application file for complete search history.

(56) References Cited

U.S. PATENT DOCUMENTS 8,519,066 B2 8/2013 Hefner, Jr.
2011/0009560 A1 1/2011 Hefner, Jr. et al.
(Continued)

FOREIGN PATENT DOCUMENTS

CN 102026950 4/2011
CN 102947261 2/2013
(Continued)

OTHER PUBLICATIONS

Kokado et al ("Rigidity-induced emission enhancement of network polymers crosslinked by tetraphenylethene derivatives", J. Mater. Chem. C, 2015, 3, 8504). (Year: 2015).*
(Continued)

*Primary Examiner* — Jiangtian Xu
(74) *Attorney, Agent, or Firm* — JCIPRNET

(57) ABSTRACT

An object is to provide a cured product, for example, that is made with a curable resin composition containing a curable resin having a particular structure, a radical polymerization initiator, and a flame retardant and therefore is superior in flame retardancy, heat resistance (high glass transition temperature), and dielectric properties (low dielectric properties). Specifically, there are provided a curable resin represented by general formula (1) below and a curable resin composition containing this curable resin, a radical polymerization initiator (B), and a flame retardant (C). (In general formula (1) above, Y is a substituent represented by general formula (2) below, and the details of the substituents and the numbers of substituents presented in general formulae (1) and (2) above are as described in the text.)

(Continued)

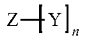

(1)

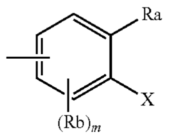

(2)

19 Claims, 3 Drawing Sheets

(51) Int. Cl.
*C08L 47/00* (2006.01)
*C09D 147/00* (2006.01)

(56) References Cited

U.S. PATENT DOCUMENTS

| | | | |
|---|---|---|---|
| 2013/0041114 | A1 | 2/2013 | Hefner, Jr. |
| 2013/0211015 | A1 | 8/2013 | Hefner, Jr. |

FOREIGN PATENT DOCUMENTS

| | | | | | |
|---|---|---|---|---|---|
| CN | 109305896 | A | * | 2/2019 | ............ C09J 125/18 |
| EP | 0260443 | | | 3/1988 | |
| EP | 0344165 | A1 | | 12/1989 | |
| EP | 0344165 | B1 | | 9/1991 | |
| JP | S6368537 | | | 3/1988 | |
| JP | S6465110 | | | 3/1989 | |
| JP | H01503238 | | | 11/1989 | |
| JP | H0543623 | | | 2/1993 | |
| JP | H0931006 | | | 2/1997 | |
| JP | 2005281618 | | | 10/2005 | |
| JP | 2005314556 | | | 11/2005 | |
| JP | 2011513581 | | | 4/2011 | |
| JP | 2013525568 | | | 6/2013 | |
| JP | 2013525569 | | | 6/2013 | |
| JP | 2015030776 | | | 2/2015 | |
| JP | 2015189925 | | | 11/2015 | |
| WO | 2021246182 | | | 12/2021 | |

OTHER PUBLICATIONS

"International Search Report (Form PCT/ISA/210) of PCT/JP2021/019096", mailed on Jul. 6, 2021, with English translation thereof, pp. 1-6.

* cited by examiner

CURABLE RESIN, CURABLE RESIN COMPOSITION, AND CURED PRODUCT

CROSS-REFERENCE TO RELATED APPLICATION

This application is a 371 application of the International PCT application serial no. PCT/JP2021/019096, filed on May 20, 2021, which claims the priority benefit of Japan Patent Application No. 2020-097139, filed on Jun. 3, 2020, and Japan Patent Application No. 2020-214257, filed on Dec. 23, 2020. The entirety of each of the above-mentioned patent applications is hereby incorporated by reference herein and made a part of this specification.

TECHNICAL FIELD

The present invention relates to a curable resin having a particular structure, a curable resin composition containing this curable resin, and a cured product, a varnish, a prepreg, and a circuit board obtained with the use of this curable resin composition.

BACKGROUND ART

The increase in telecommunication traffic in recent years has made telecommunications in high-frequency bands thriving. Against this background, there has arisen a need for electrically insulating materials having a low dielectric constant and a low dielectric loss tangent for better electrical properties, a reduced transmission loss in high-frequency bands in particular.

Printed circuit boards or electronic components made with such an electrically insulating material, furthermore, are exposed to high-temperature reflowing solder during mounting. This has created a need for highly heat-resistant materials that exhibit a high glass transition temperature. More recently, environmental issues have led to the use of high-melting, lead-free solder, resulting in a growing demand for electrically insulating materials with higher heat resistance in particular.

As an answer to these demands, the related art has proposed vinyl-bearing curable resins having various chemical structures. Examples of such curable resins proposed include curable resins such as divinylbenzyl ethers of bisphenols and polyvinylbenzyl ethers of novolaks (e.g., see PTL 1 and 2). These vinylbenzyl ethers, however, fail to give cured products having sufficiently small dielectric properties, and the resulting cured products are unsatisfactory for stable use in high-frequency bands. Divinylbenzyl ethers of bisphenols, furthermore, are far from sufficiently strong in terms of heat resistance, too.

For such vinylbenzyl ethers with enhanced characteristics, some polyvinylbenzyl ethers having a particular structure have been proposed with the aim of improving their dielectric properties, for example (e.g., see PTL 3 to 9). Researchers have made attempts to limit the dielectric loss tangent or to improve heat resistance, but the improvements achieved in these characteristics are far from sufficient. There is a need for further improvement in characteristics.

Overall, known vinyl-bearing curable resins, including polyvinyl benzyl ethers, are not ones that give a cured product combining a low dielectric loss tangent, which is required in electrically insulating material applications, in the application of electrically insulating materials capable of high-frequency use in particular, with a degree of heat resistance that allows the material to withstand soldering with lead-free solder.

Electrically insulating materials for articles like printed circuit boards, furthermore, are also required to be flame-retardant. Adding a large amount of flame retardant to fulfill the flame retardancy requirement, however, makes the material inferior in dielectric properties. For this and other reasons, the industry has yet to reach satisfactory levels of flame retardancy and dielectric properties indeed.

CITATION LIST

Patent Literature

PTL 1: Japanese Unexamined Patent Application Publication No. 63-68537

PTL 2: Japanese Unexamined Patent Application Publication No. 64-65110

PTL 3: Japanese Unexamined Patent Application Publication (Translation of PCT Application) No. 1-503238

PTL 4: Japanese Unexamined Patent Application Publication No. 5-43623

PTL 5: Japanese Unexamined Patent Application Publication No. 9-31006

PTL 6: Japanese Unexamined Patent Application Publication No. 2005-281618

PTL 7: Japanese Unexamined Patent Application Publication No. 2005-314556

PTL 8: Japanese Unexamined Patent Application Publication No. 2015-030776

PTL 9: Japanese Unexamined Patent Application Publication No. 2015-189925

SUMMARY OF INVENTION

Technical Problem

The problem to be solved by the present invention, therefore, lies in providing a curable resin having a particular structure with which the resin can contribute to heat resistance and low dielectric properties, a cured product that is made with a curable resin composition containing this curable resin, a radical polymerization initiator, and a flame retardant and therefore is superior in flame retardancy, heat resistance (high glass transition temperature), and dielectric properties (low dielectric properties), and a varnish, a prepreg, and a circuit board that contribute to or combine these performance attributes.

Solution to Problem

After extensive research to solve the above problem, the inventors found it possible to obtain a curable resin having a particular structure with which the resin can contribute to heat resistance and low dielectric properties, a cured product that is obtained with the use of a curable resin composition containing this curable resin, a radical polymerization initiator, and a flame retardant and is superior in flame retardancy, heat resistance (high glass transition temperature), and dielectric properties (low dielectric properties), and a varnish, a prepreg, and a circuit board that contribute to or combine these performance attributes. Based on these findings, the inventors have reached the completion of the present invention.

That is, the present invention relates to a curable resin represented by general formula (1) below and to a curable resin composition containing this curable resin, a radical polymerization initiator (B), and a flame retardant (C).

[Chem. 1]

$$Z\text{—}[Y]_n \quad (1)$$

(In general formula (1) above, Z is a C2 to C15 hydrocarbon, Y is a substituent represented by general formula (2) below, and n denotes an integer of 3 to 5, and

[Chem. 2]

(2)

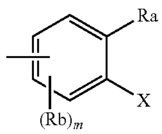

in general formula (2) above, Ra and Rb are each independently represented by a C1 to C12 alkyl, aryl, aralkyl, or cycloalkyl group, m denotes an integer of 0 to 3, and X represents a (meth)acryloyloxy, vinylbenzyl ether, or allyl ether group.)

For the curable resin according to the present invention, it is preferred that general formula (1) above be represented by general formula (1A) below.

[Chem. 3]

(1A)

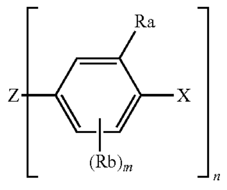

For the curable resin according to the present invention, it is preferred that the n be 4.

For the curable resin according to the present invention, it is preferred that the X be a methacryloyloxy group.

For the curable resin according to the present invention, it is preferred that the Z be an aliphatic hydrocarbon.

For the curable resin composition according to the present invention, it is preferred that it further contain a curable resin (D) other than the curable resin described above.

For the curable resin composition according to the present invention, it is preferred that the (B) ingredient be an organic peroxide in a class of dialkyl peroxides.

For the curable resin composition according to the present invention, it is preferred that the (C) ingredient contain a phosphorus flame retardant represented by any of general formulae (P-1) to (P-5) below.

[Chem. 4]

(P-1)

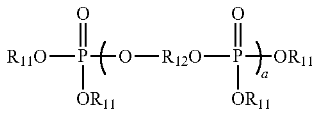

(In general formula (P-1) above, the $R_{11}$s each independently represent a C1 to C12 alkyl, aryl, aralkyl, or cycloalkyl group, $R_{12}$ represents an alkylene or arylene group, and a denotes an integer of 0 to 3.)

[Chem. 5]

(P-2)

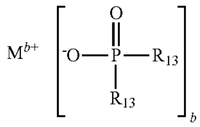

(In general formula (P-2) above, the $R_{13}$s each independently represent a C1 to C12 alkyl, aryl, aralkyl, or cycloalkyl group, $M^{b+}$ represents a metal ion with a valency of b, and b denotes an integer of 1 to 3.)

[Chem. 6]

(P-3)

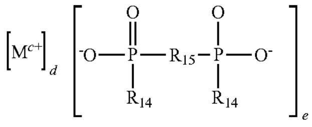

(In general formula (P-3) above, the $R_{14}$s each independently represent a C1 to C12 alkyl, aryl, aralkyl, or cycloalkyl group, $R_{15}$ represents an alkylene or arylene group, $M^{c+}$ represents a metal ion with a valency of c, c, d, and e each independently denote an integer of 1 to 3, and c×d=2×e.)

[Chem. 7]

(P-4)

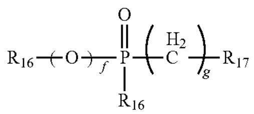

(In general formula (P-4) above, the $R_{16}$s each independently represent a C1 to C12 alkyl, aryl, aralkyl, or cycloalkyl group, optionally forming a cyclic structure together with the phosphorus atom, $R_{17}$ represents a vinyl, vinylbenzyl, or (meth)acryloyloxy group, and f and g each independently denote 0 or 1.)

[Chem. 8]

(P-5)

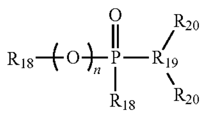

(In general formula (P-5) above, the $R_{18}$s each independently represent a C1 to C12 alkyl, aryl, aralkyl, or cycloalkyl group, optionally forming a cyclic structure together with the phosphorus atom, $R_{19}$ represents a divalent group having an arylene structure, $R_{20}$ represents a (meth)acryloyloxy, vinylbenzyl ether, or allyl ether group, and h denotes 0 or 1.)

For the curable resin composition according to the present invention, it is preferred that the (D) ingredient be at least one curable resin selected from the group consisting of epoxy resins, phenolic resins, active ester resins, cyanate ester resins, maleimide resins, benzoxazine resins, polyphenylene ether resins, and vinyl resins.

The present invention relates to a cured product obtained by curing the above curable resin composition.

The present invention relates to a varnish that is a dilution of the above curable resin composition in an organic solvent.

The present invention relates to a prepreg having a reinforcing base material and a half-cured form of the above varnish impregnated into the reinforcing base material.

The present invention relates to a circuit board obtained by shaping a stack of the above prepreg and copper foil by thermocompression.

Advantageous Effects of Invention

The curable resin according to the present invention are superior in heat resistance and low dielectric properties. The cured product obtained with the use of a curable resin composition containing this curable resin, a radical polymerization initiator, and a flame retardant are superior in flame retardancy, heat resistance, and low dielectric properties. By virtue of these, the curable resin and the cured product are useful ones.

DESCRIPTION OF EMBODIMENTS

Figure 1:
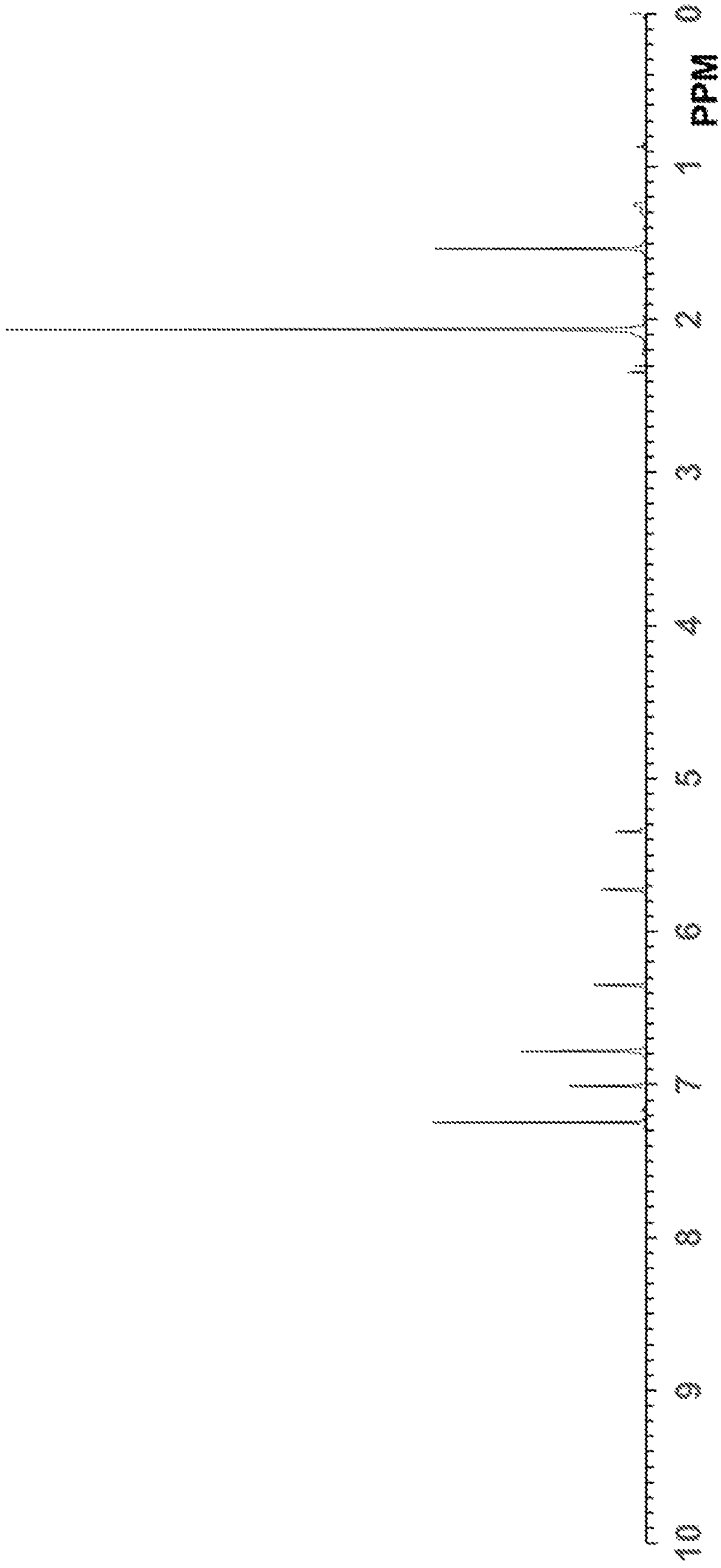
FIG. 1 is a $^1$H-NMR spectrum of a curable resin obtained in Example 1.

The present invention will now be described in detail.

<Curable Resin>

The present invention relates to a curable resin represented by general formula (1) below. A curable resin represented by general formula (1) below is hereinafter referred to as curable resin (A) (or "the (A) ingredient").

[Chem. 9]

$$Z{-}[Y]_n \quad (1)$$

In general formula (1) above, Z is a C2 to C15 hydrocarbon, Y is a substituent represented by general formula (2) below, and n denotes an integer of 3 to 5.

[Chem. 10]

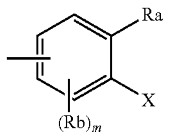

(2)

In general formula (2) above, Ra and Rb are each independently represented by a C1 to C12 alkyl, aryl, aralkyl, or cycloalkyl group, m denotes an integer of 0 to 3, and X represents a (meth)acryloyloxy, vinylbenzyl ether, or allyl ether group.

Since the (A) ingredient contains multiple crosslinking groups (X), the cured product obtained by crosslinking the (A) ingredient will be superior in heat resistance by virtue of its high crosslink density. Although the crosslinking groups are also polar groups, the presence of the substituents adjacent to the crosslinking groups (Ra in particular) keeps the molecular mobility of the crosslinking groups low. This is preferred as it helps the resulting cured product meet the low dielectric properties requirement (low dielectric loss tangent in particular).

In general formula (1) above, Z is a C2 to C15 hydrocarbon, preferably a C2 to C10 hydrocarbon, more preferably a C2 to C6 hydrocarbon. Since the number of carbon atoms is in this range, the (A) ingredient is a low-molecular-weight compound. This brings the resulting cured product into its preferred form compared with when the (A) ingredient is a high-molecular-weight compound because in that case the cured product will be superior in heat resistance by virtue of an increased crosslink density and a high glass transition temperature. It should be noted that when the number of carbon atoms is two or more, the resulting curable resin is a high-molecular-weight compound. This is preferred because in that case the cured product will not only be quick to form a film, for example, but also tends to be superior in the ease of handling, bendability, flexibility, and resistance to brittle fracture by virtue of a low crosslink density compared with when the number of carbon atoms is fewer than two. When the number of carbon atoms is 15 or fewer, furthermore, the resulting curable resin is a low-molecular-weight compound. This is preferred because in that case the resulting cured product will be superior in heat resistance by virtue of an increased percentage of crosslinking groups (X) in the (A) ingredient and the accordingly improved crosslink density compared with when the number of carbon atoms exceeds 15.

The hydrocarbon can be any C2 to C15 hydrocarbon, but preferably is, for example, an aliphatic hydrocarbon, such as an alkane, alkene, or alkyne. Examples include aromatic hydrocarbons containing an aryl or similar group and hybrid compounds of aliphatic and aromatic hydrocarbons.

Of aliphatic hydrocarbons, examples of alkanes include ethane, propane, butane, pentane, hexane, and cyclohexane.

Examples of alkenes include those containing a group such as a vinyl, 1-methylvinyl, propenyl, butenyl, or pentenyl group.

Examples of alkynes include those containing a group such as an ethynyl, propynyl, butynyl, pentynyl, or hexynyl group.

Examples of aromatic hydrocarbons include those containing a group such as a phenyl, tolyl, xylyl, or naphthyl group as their aryl group.

Examples of hybrid compounds of aliphatic and aromatic hydrocarbons include those containing a group such as a benzyl, phenylethyl, phenylpropyl, tolylmethyl, tolylethyl, tolylpropyl, xylylmethyl, xylylethyl, xylylpropyl, naphthylmethyl, naphthylethyl, or naphthylpropyl group.

Of such hydrocarbons, it is particularly preferred that Z be an aliphatic, aromatic, or alicyclic hydrocarbon composed solely of carbon and hydrogen atoms because in that case the resulting cured product will have low dielectric properties (low dielectric constant and low dielectric loss tangent) by virtue of its low polarity. In particular, hydrocarbons like general formulae (3-1) to (3-6) below, having very low polarity and industrially practical, are preferred. More preferably, Z is an aliphatic hydrocarbon, such as general formula (3-1) or (3-4) below. In general formula (3-1) below, k represents an integer of 0 to 5, preferably is from 0 to 3, and it is preferred that Re in general formulae (3-1), (3-2), and (3-4) to (3-6) be represented by a hydrogen atom or methyl group.

[Chem. 11]

(3-1)

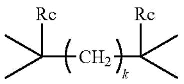

(3-2)

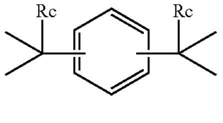

(3-3)

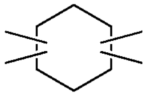

(3-4)

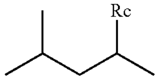

(3-5)

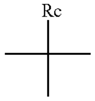

(3-6)

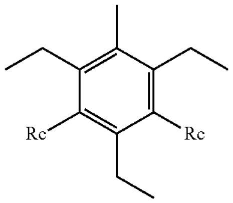

In general formula (2) above, Ra and Rb each independently represent a C1 to C12 alkyl, aryl, aralkyl, or cycloalkyl group, preferably are C1 to C4 alkyl, aryl, aralkyl, or cycloalkyl groups. C1 to C12 alkyl, for example, groups present as Ra and Rb reduce the planarity of the (A) ingredient near its benzene ring, and the associated decrease in crystallinity brings the curable resin into its preferred form in which its solubility in solvents is improved and its melting point is low at the same time. By virtue of having such Ra and Rb (in particular, Ra, which is adjacent to the crosslinking groups X), furthermore, the (A) ingredient probably achieves even lower molecular mobility of the crosslinking groups (X) owing to steric hindrance by these groups. This is preferred because in that case the resulting cured product will have lower dielectric properties (lower dielectric loss tangent in particular). More preferably, Ra and Rb do not thermally decompose when heated.

In general formula (2), m represents an integer of 0 to 3. Preferably, m is 0 or 1, more preferably 1. Since m is in this range, the molecular mobility of the crosslinking groups (X) is low by virtue of steric hindrance by the substituent Rb. The cured product, therefore, will be in its preferred form in which it is superior in low dielectric properties. If m is 0, Rb represents a hydrogen atom.

In general formula (1) above, n is the number of substituents. n denotes an integer of 3 to 5, preferably is 3 or 4, more preferably 4. Since the n is in this range, the (A) ingredient is a low-molecular-weight compound. This brings the resulting cured product into its preferred form compared with when the (A) ingredient is a high-molecular-weight compound because in that case the cured product will be superior in heat resistance by virtue of an increased crosslink density and a high glass transition temperature. An n of 3 or greater is preferred because it means there are many crosslinking groups (X). In that case the crosslink density of the resulting cured product will be high enough that the cured product will achieve sufficiently high heat resistance. An n of 5 or less, furthermore, is more preferred because in that case the crosslink density of the cured product will not be excessively high; the cured product, therefore, will not only be quick to form a film, for example, but also be superior in the ease of handling, bendability, flexibility, and resistance to brittle fracture.

In general formula (2) above, X is a crosslinking (meth) acryloyloxy, vinylbenzyl ether, or allyl ether group, preferably a (meth)acryloyloxy group, more preferably a methacryloyloxy group. The presence of such crosslinking groups in the (A) ingredient brings the cured product into its preferred form in which it has a low dielectric loss tangent. The methacryloyloxy group is preferred because with this group the (A) ingredient contains methyl groups in its structure compared with other crosslinking groups (e.g., the vinylbenzyl, allyl ether, and other polar ether groups). In that case the molecular mobility is probably even lower because of greater steric hindrance, and the resulting cured product will have a lower dielectric loss tangent. The presence of multiple crosslinking groups, furthermore, is preferred because in that case heat resistance is improved by virtue of an increased crosslink density.

The crosslinking groups X, furthermore, are also polar groups, but the molecular mobility of X is limited because of steric hindrance caused by the presence of the substituents Ra and Rb (Ra in particular) next to X. This brings the resulting cured product into its preferred form in which its dielectric loss tangent is low.

Preferably, for the (A) ingredient, general formula (1) above is represented by general formula (1A) below. By narrowing general formula (1) above down to the structures of general formula (1A) below, or in the structural formula presented in general formula (1A) below, the position of Z in relation to Ra and X is fixed (limited) compared with that in the structural formula presented in general formula (1) above. A curable resin having such a structure represented by general formula (1A) below, furthermore, is able to form a densely crosslinked structure compared with a curable resin having a structure represented by general formula (1) above by virtue of increased reactivity of the crosslinking groups. With such a resin, the cured product will be in its preferred form in which it is better in resistance to thermal decomposition.

[Chem. 12]

(1A)

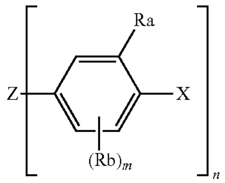

For the (A) ingredient, it is preferred that the n be 4. An n of 4 in general formula (1A) gives the (A) ingredient a high crosslink density without too many crosslinking groups. This brings the cured product into its more preferred form in which it has sufficiently high heat resistance and is superior in the ease of handling, bendability, flexibility, and resistance to brittle fracture at the same time.

For the (A) ingredient, it is preferred that the X be a methacryloyloxy group. A methacryloyloxy group present as X in general formula (1A) above, or the resulting presence of such a crosslinking group in the (A) ingredient, brings the cured product into its preferred form in which it has a low dielectric loss tangent. The methacryloyloxy group is more preferred because with this group the (A) ingredient contains methyl groups in its structure compared with other crosslinking groups (e.g., the vinylbenzyl, allyl ether, and other polar ether groups). In that case the molecular mobility is probably even lower because of greater steric hindrance, and the resulting cured product will have a lower dielectric loss tangent. The presence of multiple crosslinking groups, furthermore, is more preferred because in that case heat resistance is improved by virtue of an increased crosslink density.

For the (A) ingredient, it is preferred that the Z be an aliphatic hydrocarbon. An aliphatic hydrocarbon present as Z in general formula (1A) above brings the cured product into its more preferred form in which it has low dielectric properties (low dielectric constant and low dielectric loss tangent) by virtue of reduced polarity.

In general formula (1A) above, furthermore, it is preferred that Z be a C2 to C15 aliphatic hydrocarbon. More preferably, Z is a C2 to C10 aliphatic hydrocarbon. The presence of two or more carbon atoms is preferred because in that case the cured product will be superior in resistance to brittle fracture by virtue of a reduced crosslink density compared with when the number of carbon atoms is fewer than two. The presence of 15 or fewer carbon atoms is preferred because in that case the cured product will be superior in heat resistance by virtue of an increased crosslink density compared with when the number of carbon atoms exceeds 15. Examples of such aliphatic hydrocarbons are the same as listed for aliphatic hydrocarbons as an example of hydrocarbons in general formula (1) above.

In general formula (1A) above, Ra, Rb, m, and n are synonymous with Ra, Rb, m, and n, respectively, in general formulae (1) and (2) above.

General formula (1) above includes not only general formula (1A) above but also general formula (1B) below. General formula (1A), however, is more preferred because the crosslinking groups X in this formula are more reactive by virtue of their position. This ensures the (A) ingredient cures quickly, eliminating the possibility that uncured residue of the ingredient will lower thermal decomposition temperature.

[Chem. 13]

(1B)

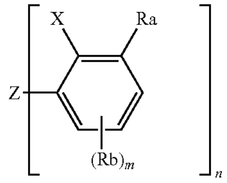

<Method for Producing an Intermediate Phenolic Compound>

As a method for producing the (A) ingredient, a method for producing an intermediate phenolic compound, a raw material for (precursor to) the (A) ingredient, will now be described first.

A possible method for producing the intermediate phenolic compound is to mix an aldehyde or ketone compound indicated by general formulae (4) to (9) below with a phenol or derivative thereof indicated by general formulae (10) to (16) below and allowing them to react in the presence of an acid catalyst to give the intermediate phenolic compound. It should be noted that k, Ra, and Rb in general formulae (4) to (16) below are synonymous with k, Ra, ad Rb, respectively, in general formula (2) and (3-1) above.

[Chem. 14]

(4)

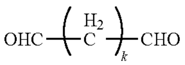

(5)

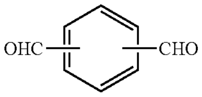

(6)

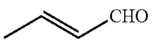

(7)

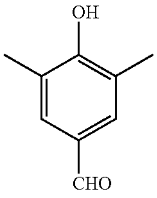

(8)

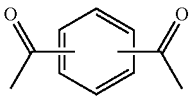

(9)

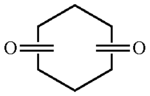

[Chem. 15]

(10)

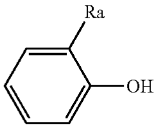

-continued (11)

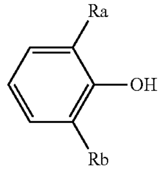

(12)

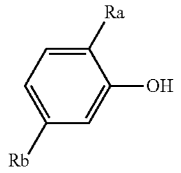

(13)

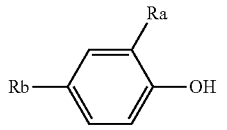

(14)

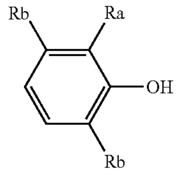

(15)

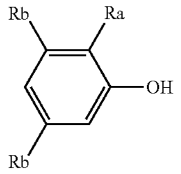

(16)

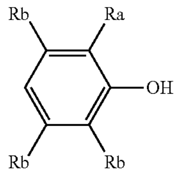

For the aldehyde or ketone compound (Hereinafter also referred to as "compound (a).") , specific examples include formaldehyde, acetaldehyde, propionaldehyde, pivalaldehyde, butyraldehyde, pentanal, hexanal, trioxane, cyclohexylaldehyde, diphenylacetaldehyde, ethylbutyraldehyde, benzaldehyde, glyoxylic acid, 5-norbornene-2-carboxaldehyde, malondialdehyde, succindialdehyde, salicylaldehyde, naphthaldehyde, glyoxal, malondialdehyde, succinaldehyde, glutaraldehyde, crotonaldehyde, and phthalaldehyde for aldehyde compounds. Of such aldehyde compounds, aldehydes such as glyoxal, glutaraldehyde, crotonaldehyde, and phthalaldehyde are particularly preferred because of their high industrial availability. As for ketone compounds, cyclohexanedione and diacetylbenzene are preferred. In particular, cyclohexanedione is more preferred because of its high industrial availability. The compound (a) used does not need to be only one compound; combination use of two or more is also allowed.

The phenol or derivative thereof (Hereinafter also referred to as "compound (b).") can be of any kind, but specific examples include cresols, such as o-cresol, m-cresol, and p-cresol; phenol; xylenols, such as 2,3-xylenol, 2,4-xylenol, 2,5-xylenol, 2,6-xylenol (2,6-dimethylphenol), 3,4-xylenol, 3,5-xylenol, and 3,6-xylenol; ethylphenols, such as o-ethylphenol (2-ethylphenol), m-ethylphenol, and p-ethylphenol; isopropylphenol and butylphenols, such as butylphenol and p-t-butylphenol; alkylphenols, such as p-pentylphenol, p-octylphenol, p-nonylphenol, and p-cumylphenol; and o-phenylphenol (2-phenylphenol), p-phenylphenol, 2-cyclohexylphenol, 2-benzylphenol, 2,3,6-trimethylphenol, 2,3,5-trimethylphenol, 2-cyclohexyl-5-methylphenol, 2-t-butyl-5-methylphenol, 2-isopropyl-5-methylphenol, 2-methyl-5-isopropylphenol, 2,6-t-butylphenol, 2,6-diphenylphenol, 2,6-dicyclohexylphenol, 2,6-diisopropylphenol, 3-benzylbiphenyl-2-ol, 2,4-di-t-butylphenol, 2,4-diphenylphenol, and 2-t-butyl-4-methylphenol. One such phenol or derivative thereof may be used alone, or two or more may be used in combination. In particular, using compound(s) derived by alkylating two of the ortho and para positions with respect to the phenolic hydroxy group, such as 2,6-xylenol and/or 2,4-xylenol, brings the cured product into its preferred form. If the steric hindrance is too great, however, there can be a situation in which the reactivity of the compound during the synthesis of the intermediate phenolic compound is affected. It is, therefore, preferred to use a compound (b) having, for example, a methyl, ethyl, isopropyl, cyclohexyl, or benzyl group.

In a method for producing the intermediate phenolic compound used for the present invention, charging a reactor with compounds (a) and (b), preferably in a molar ratio of compound (b) to compound (a) (compound (b)/compound (a)) of 0.1 to 10, more preferably 0.2 to 8, and allowing them to react in the presence of an acid catalyst will give the intermediate phenolic compound.

Examples of acid catalysts used for this reaction include inorganic acids, like phosphoric acid, hydrochloric acid, and sulfuric acid, organic acids, such as oxalic acid, benzenesulfonic acid, toluenesulfonic acid, methanesulfonic acid, and fluoromethanesulfonic acid, solid acids, like activated clay, montmorillonite clay, silica alumina, zeolite, and strongly acidic ion exchange resins, and heteropolyacid. It is, however, preferred to use an inorganic acid, oxalic acid, benzenesulfonic acid, toluenesulfonic acid, methanesulfonic acid, or fluoromethanesulfonic acid because these acids are homogeneous catalysts and thus can be removed easily and conveniently by neutralization with a base and washing with water after the reaction.

As for the amount of the acid catalyst, the acid catalyst is added in such a manner that its amount will be in the range of 0.001 to 40 parts by mass per 100 parts by mass combined of the initial raw-material compounds (a) and (b). For the ease of handling and economy reasons, however, it is preferred that the amount of the catalyst be from 0.001 to 25 parts by mass.

The reaction temperature usually only needs to be in the range of 30° C. to 150° C., but if the manufacturer wants to limit the formation of isomeric structures and avoid side reactions, such as thermal decomposition, to obtain a high-purity intermediate phenolic compound, it is preferred that the reaction temperature be from 60° C. to 120° C.

As for the duration of the reaction, the reaction does not proceed completely in a short period of time, and an extended duration of reaction causes side reactions, such as the thermal decomposition of the product. The duration of reaction, therefore, is usually in the range of a total of 0.5 to 24 hours under the above reaction temperature conditions, but preferably is in the range of a total of 0.5 to 15 hours.

In this method for producing an intermediate phenolic compound, extra solvents are not necessarily required because the phenol or derivative thereof doubles as a solvent. The use of solvents, however, is also allowed.

Examples of organic solvents used to synthesize the intermediate phenolic compound include ketones, such as acetone, methyl ethyl ketone (MEK), methyl isobutyl ketone, cyclohexanone, and acetophenone, alcohols, such as 2-ethoxyethanol, methanol, and isopropyl alcohol, aprotic solvents, such as N,N-dimethylformamide, N,N-dimethylacetamide, dimethylsulfoxide, N-methyl-2-pyrrolidone, acetonitrile, and sulfolane, cyclic ethers, such as dioxane and tetrahydrofuran, esters, such as ethyl acetate and butyl acetate, and aromatic solvents, such as benzene, toluene, and xylene. One such solvent alone or a mixture may be used.

Preferably, the hydroxyl equivalent weight (phenol equivalent) of the intermediate phenolic compound is from 80 to 500 g/eq, more preferably from 100 to 300 g/eq, for heat resistance reasons. The hydroxyl equivalent weight (phenol equivalent) of the intermediate phenolic compound is a value calculated by titration. The titration refers to neutralization titration according to JIS K0070.

<Method for Producing the Curable Resin (A)>

A method for producing the (A) ingredient (introduction of a (meth)acryloyloxy, vinylbenzyl ether, or allyl ether group into the intermediate phenolic compound) will now be described.

The (A) ingredient can be obtained by known methods, such as allowing, for example, a (meth)acrylic anhydride, (meth)acrylic acid chloride, chloromethylstyrene, chlorostyrene, allyl chloride, or allyl bromide (hereinafter also referred to as "(meth)acrylic anhydride or such like") to react with the intermediate phenolic compound in the presence of a basic or acidic catalyst. By allowing the two compounds to react, crosslinking groups (X) can be introduced into the intermediate phenolic compound. This, furthermore, brings the thermosetting into its preferred form in which it has a low dielectric constant and a low dielectric loss tangent.

Examples of (meth)acrylic anhydrides include acrylic anhydride and methacrylic anhydride. Examples of (meth) acrylic acid chlorides include methacrylic acid chloride and acrylic acid chloride. Examples of chloromethylstyrenes, furthermore, include p-chloromethylstyrene and m-chloromethylstyrene, examples of chlorostyrenes include p-chlorostyrene and m-chlorostyrene, an example of an allyl chloride is 3-chloro-1-propene, and an example of an allyl bromide is 3-bromo-1-propene. One such compound alone or a mixture may be used. In particular, it is preferred to use methacrylic anhydride or methacrylic acid anhydride because with these starting materials, the resulting cured product will have a lower dielectric loss tangent.

Specific examples of basic catalysts include dimethylaminopyridine, tetrabutylammonium bromide (TBAB), alkaline earth metal hydroxides, alkali metal carbonates, and alkali metal hydroxides. Specific examples of acidic catalysts include sulfuric acid and methanesulfonic acid. Dimethylaminopyridine, in particular, is superior in terms of catalytic activity.

An example of a reaction between the intermediate phenolic compound and the (meth)acrylic anhydride or such like is a method in which 1 to 10 moles of the (meth)acrylic anhydride or such like, per mole of hydroxyl groups in the intermediate phenolic compound, is added to the intermediate phenolic compound, and the two compounds are allowed to react at a temperature of 30° C. to 150° C. for 1 to 40 hours while 0.01 to 0.2 moles of a basic catalyst is added all at once or gradually.

By using an organic solvent during the reaction with the (meth)acrylic anhydride or such like (introduction of crosslinking groups), the reaction in the synthesis of the (A) ingredient can be accelerated. Such an organic solvent can be of any kind, but examples include ketones, such as acetone and methyl ethyl ketone (MEK), alcohols, such as methanol, ethanol, 1-propyl alcohol, isopropyl alcohol, 1-butanol, secondary butanol, and tertiary butanol, cellosolves, such as methyl cellosolve and ethyl cellosolve, ethers, such as tetrahydrofuran, 1,4-dioxane, 1,3-dioxane, and diethoxyethane, aprotic polar solvents, such as acetonitrile, dimethylsulfoxide, and dimethylformamide, and toluene. One such organic solvent may be used alone, or two or more may optionally be used in combination to adjust polarity.

After the end of the above reaction with the (meth)acrylic anhydride or such like (introduction of crosslinking groups), the reaction product is reprecipitated in a poor solvent, and then the precipitate is stirred in the poor solvent at a temperature of 20° C. to 100° C. for 0.1 to 5 hours. Filtering the mixture under reduced pressure and then drying the precipitate at a temperature of 40° C. to 80° C. for 1 to 10 hours will give the desired (A) ingredient. An example of a poor solvent is hexane.

Preferably, the softening point of the (A) ingredient is 150° C. or below, more preferably from 20° C. to 140° C. A softening point of the (A) ingredient in these ranges is preferred because in that case the (A) ingredient is superior in workability.

The present invention relates to a curable resin composition as described above, a resin composition containing the above curable resin (A) and a radical polymerization initiator (B) and a flame retardant (C) both as described below. The curable resin composition is useful as it can contribute to flame retardancy, heat resistance, and low dielectric properties.

<Curable Resin (D)>

Preferably, the curable resin composition according to the present further contains a curable resin (D) other than the (A) ingredient (Also referred to as "the (D) ingredient."). Using a curable resin composition containing the (D) ingredient brings the cured product into its preferred form in which it has performance attributes imparted by the individual curable resins.

Preferably, the (D) ingredient is at least one curable resin selected from the group consisting of epoxy resins, phenolic resins, active ester resins, cyanate ester resins, maleimide resins, benzoxazine resins, polyphenylene ether resins, and vinyl resins for high heat resistance, high adhesiveness, low thermal expansion, and miscibility reasons.

An example of an epoxy resin is one or a mixture of two or more selected from dicyclopentadiene epoxy resins, bisphenol A epoxy resins, bisphenol F epoxy resins, bisphenol S epoxy resins, phenol-novolak epoxy resins, cresol-novolak epoxy resins, bisphenol A-novolak epoxy resins, salicylaldehyde-novolak epoxy resins, bisphenol F-novolak epoxy resins, alicyclic epoxy resins, glycidyl ester epoxy resins, glycidyl amine epoxy resins, hydantoin epoxy resins, isocyanurate epoxy resins, and aliphatic cyclic epoxy resins, halides and hydrogenated derivatives thereof, and mixtures of such resins.

Examples of phenolic resins include phenol novolak, o-cresol novolak, p-cresol novolak, t-butylphenol novolak, dicyclopentadiene cresol, polyparavinylphenol, bisphenol A novolak, phenol aralkyl resins, naphthol aralkyl resins, biphenyl phenol-novolak resins, biphenyl naphthol-novolak resins, decalin-modified novolaks, poly(di-o-hydroxyphenyl)methane, poly(di-m-hydroxyphenyl)methane, and poly (di-p-hydroxyphenyl)methane.

An example of an active ester resin is an active ester compound derived from the product of the reaction of a carboxylic acid compound and/or a thiocarboxylic acid compound with a hydroxy compound and/or a thiol compound.

Examples of cyanate ester resins include bis(4-cyanatophenyl)ethane, 2,2-bis(4-cyanatophenyl)propane, 2,2-bis(3,5-dimethyl-4-cyanatophenyl)methane, 2,2-bis(4-cyanatophenyl)-1,1,1,3,3,3-hexafluoropropane, α,α'-bis(4-cyanatophenyl)-m-diisopropylbenzene, and cyanate esters of polymers of the dicyclopentadiene-phenol adduct.

Examples of maleimide resins include 4,4'-diphenylmethane bismaleimide, m-phenylene bismaleimide, bisphenol A diphenylether bismaleimide, 3,3'-dimethyl-5,5'-diethyl-4,4'-diphenylmethane bismaleimide, 4-methyl-1,3-phenylene bismaleimide, and 1,6'-bismaleimido-(2,2,4-trimethyl) hexane.

Examples of benzoxazine resins include Fa benzoxazine compounds, which are obtained through reaction between a bisphenol compound and an amine compound (e.g., aniline) like, for example, bisphenol A benzoxazine compounds and bisphenol F benzoxazine compounds, and Pd benzoxazine compounds, which are obtained through reaction between a phenyldiamine compound and a phenolic compound like, for example, diaminodiphenylmethane benzoxazine compounds.

Examples of polyphenylene ether resins include poly(2,6-dimethyl-1,4-phenylene)ether, polymer alloys of poly(2,6-dimethyl-1,4-phenylene)ether and polystyrene, and polymer alloys of poly(2,6-dimethyl-1,4-phenylene)ether and a styrene-butadiene copolymer.

Examples of vinyl resins include triallyl isocyanurate and other trialkenyl isocyanurate compounds, polybutadiene resins whose repeat unit is 1,2-butadiene, cis-1,4-butadiene, or trans-1,4-butadiene, styrenes having a vinylbenzyl group in their molecule, and divinylbenzene and other vinylbenzyl compounds.

For use as the (D) ingredient, maleimide resins, cyanate ester resins, polyphenylene ether resins, and vinyl resins, in particular, are preferred because they reduce the dielectric loss tangent.

Preferably, the curable resin composition according to the present invention contains 0 to 80 parts by mass, more preferably 0 to 60 parts by mass, of the (D) ingredient per 100 parts by mass of the (A) ingredient. The (D) ingredient can be added to an extent that it does not impair the characteristics of the present invention and can optionally be used, not to exceed the amount of the (A) ingredient, when the manufacturer wants to impart characteristics derived from the (D) ingredient.

<Radical Polymerization Initiator (B)>

The curable resin composition according to the present invention contains a radical polymerization initiator (B) (Also referred to as "the (B) ingredient."). Using a curable resin composition containing the (B) ingredient brings the resulting cured product into its preferred form in which it is superior in heat resistance because in that case little of low-molecular-weight ingredients remains unreacted by virtue of improved reactivity.

Examples of (B) ingredients include isobutyl peroxide, α,α'-bis(neodecanoylperoxy)diisopropylbenzene, cumyl peroxyneodecanoate, di-n-propyl peroxydicarbonate, 1,1,3,3-tetramethylbutyl peroxyneodecanoate, diisopropyl peroxydicarbonate, 1-cyclohexyl-1-methylethyl peroxyneodecanoate, di-2-ethoxyethyl peroxydicarbonate, di(2-ethylhexylperoxy) dicarbonate, t-hexyl peroxyneodecanoate, dimethoxybutyl peroxydidecanoate, di(3-methyl-3-methoxybutylperoxy) dicarbonate, t-butyl peroxyneodecanoate, t-hexyl peroxypivalate, t-butyl peroxypivalate, 3,5,5-trimethylhexanoyl peroxide, octanoyl peroxide, 1,1,3,3-tetramethylbutyl peroxy-2-ethylhexanoate, 2,5-dimethyl-2,5-di(2-ethylhexanoylperoxy)hexane, 1-cyclohexyl-1-methylethyl peroxy-2-ethylhexanoate, t-hexyl peroxy-2-ethylhexanoate, t-butyl peroxy-2-ethylhexanoate, m-toluoyl peroxide, t-butyl peroxyisobutyrate, 1,1-bis(t-butylperoxy)cyclohexane, α,α'-bis(t-butylperoxy) diisopropylbenzene, dicumyl peroxide, 2,5-dimethyl-2,5-di (t-butylperoxy)hexane, t-butyl cumyl peroxide, di-t-butyl peroxide, 2,5-dimethyl-2,5-di(t-butylperoxy)hexyne-3, t-butyl trimethylsilyl peroxide, and 2,3-dimethyl-2,3-diphenylbutane. It is particularly preferred that the (B) ingredient be an organic peroxide in the class of dialkyl peroxides because this improves crosslink density. In particular, the use of α,α'-bis(t-butylperoxy)diisopropylbenzene, dicumyl peroxide, 2,5-dimethyl-2,5-di(t-butylperoxy)hexane, t-butyl cumyl peroxide, di-t-butyl peroxide, or 2,5-dimethyl-2,5-di (t-butylperoxy)hexyne-3 is more preferred.

Preferably, the curable resin composition according to the present invention contains 0.05 to 30 parts by mass, more preferably 0.1 to 20 parts by mass, even more preferably 0.5 to 10 parts by mass of the (B) ingredient per 100 parts by mass of the (A) ingredient. The presence of 0.05 parts by mass or more of the (B) ingredient is preferred because in that case little of low-molecular-weight ingredients remains unreacted by virtue of improved reactivity and, therefore, the resulting cured product will be superior in heat resistance. Making the (B) ingredient content 100 parts by mass or less, on the other hand, brings the resulting cured product into its preferred form because in that case the associated worsening of dielectric properties is limited.

<Flame Retardant (C)>

The curable resin composition according to the present invention contains a flame retardant (C) (Also referred to as "the (C) ingredient."). A cured product obtained using a curable resin composition containing the (C) ingredient is in its preferred form because it is superior in flame retardancy.

Any kind of (C) ingredient can be used, but examples include phosphorus flame retardants, nitrogen compounds, silicone flame retardants, metal hydroxides, and polysilanes. For phosphorus flame retardants, organic phosphorus flame retardants, reactive organic phosphorus flame retardants, and organic nitrogen-containing phosphorus compounds, for example, are preferred.

Examples of organic phosphorus flame retardants include phenanthrene phosphorus compounds, such as Sanko Inc.'s HCA, HCA-HQ, and HCA-NQ, phosphorus-containing benzoxazine compounds, such as Showa Highpolymer Co., Ltd.'s HFB-2006M, phosphate compounds, such as Ajinomoto Fine-Techno Co., Inc.'s REOFOS 30, 50, 65, 90, 110, TPP, RPD, BAPP, CPD, TCP, TXP, TBP, TOP, KP140, and TIBP, ADEKA Corporation's FP-800 and FP-600, Hokko Chemical Industry Co., Ltd.'s PPQ, and Daihachi Chemical Co., Ltd.'s PX-200, organic phosphinates, such as Clariant K.K.'s OP930, OP935, and OP945, phosphorus-containing epoxy resins, such as Tohto Kasei Co., Ltd.'s FX289 and FX305, phosphorus-containing phenoxy resins, such as Tohto Kasei Co., Ltd.'s ERF001, and phosphorus-containing epoxy resins, such as Japan Epoxy Resins Co., Ltd.'s YL7613.

Examples of reactive organic phosphorus flame retardants include Katayama Chemical Industries Co., Ltd.'s MC-2, MC-4, S-2, S-4, V1, V2, V3, V4, V5, W-1o, W-2h, W-2o, W-3o, and W-4o.

Examples of organic nitrogen-containing phosphorus compounds include phosphate ester/amide compounds, such as Shikoku Chemicals Corporation's SP670 and SP703, and phosphazene compounds, such as Otsuka Chemical Co., Ltd.'s SPB100 and SPE100 and Fushimi Manufacturing Co., Ltd.'s FP flame retardants.

Examples of metal hydroxides include magnesium hydroxides, such as Ube Material Industries, Ltd.'s UD65, UD650, and UD653, and aluminum hydroxides, such as Tomoe Engineering Co., Ltd.'s B-30, B-325, B-315, B-308, B-303, and UFH-20. Examples of polysilanes include Osaka Gas Chemicals Co., Ltd.'s SI-10, SI-20, and SI-30.

Common flame retardants tend to increase the dielectric loss tangent of a composition made therewith. For use as the (C) ingredient, however, phosphate compounds, such as Daihachi Chemical Co., Ltd.'s PX-200, the organic phosphinates of Clariant K.K.'s OP930, OP935, and OP945, and reactive organic phosphorus flame retardants, such as Katayama Chemical Industries Co., Ltd.'s MC-2, MC-4, S-2, S-4, V1, V2, V3, V4, V5, W-1o, W-2h, W-2o, W-3o, and W-4o, are preferred because they help reduce the dielectric loss tangent in particular.

Preferably, the (C) ingredient contains a phosphorus flame retardant represented by any of general formulae (P-1) to (P-5) below.

[Chem. 16]

(P-1)

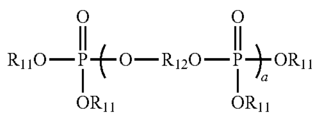

In general formula (P-1) above, the $R_{11}$s each independently represent a C1 to C12 alkyl, aryl, aralkyl, or cycloalkyl group. For a low dielectric loss tangent, it is preferred that the $R_{11}$s be phenyl groups substituted at the 2- and 6-positions, 2,6-dimethylphenyl groups in particular. $R_{12}$ represents an alkylene or arylene group and preferably is a phenylene group for heat resistance. a denotes an integer of 0 to 3 and preferably is 0 or 1 for flame retardancy.

[Chem. 17]

(P-2)

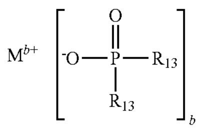

In general formula (P-2) above, the $R_{13}$s each independently represent a C1 to C12 alkyl, aryl, aralkyl, or cycloalkyl group. For a low dielectric constant, it is preferred that the $R_{13}$s be methyl, ethyl, propyl, butyl, cyclohexyl, benzyl, or phenyl groups. $M^{b+}$ represents a metal ion with a valency of b. The metal can be, for example, aluminum, magnesium, sodium, potassium, or calcium and preferably is aluminum for flame retardancy. b denotes an integer of 1 to 3 and preferably is 3 for flame retardancy.

[Chem. 18]

(P-3)

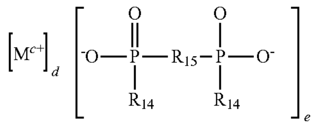

In general formula (P-3) above, the $R_{14}$s each independently represent a C1 to C12 alkyl, aryl, aralkyl, or cycloalkyl group. For a low dielectric constant, it is preferred that the $R_{14}$s be methyl, ethyl, propyl, butyl, cyclohexyl, benzyl, or phenyl groups. $R_{15}$ represents an alkylene or arylene group and preferably is a phenylene group for heat resistance. $M^{c+}$ represents a metal ion with a valency of c. The metal can be, for example, aluminum, magnesium, sodium, potassium, or calcium and preferably is aluminum for flame retardancy. c, d, and e each independently denote an integer of 1 to 3. For flame retardancy, it is preferred that c be 3, d be 2, and e be 3, preferably c×d=2×e.

[Chem. 19]

(P-4)

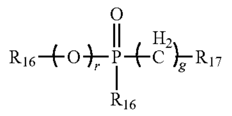

In general formula (P-4) above, the $R_{16}$s each independently represent a C1 to C12 alkyl, aryl, aralkyl, or cycloalkyl group. For heat resistance, it is preferred that the $R_{16}$s be phenyl groups. The $R_{16}$s may form a cyclic structure together with the phosphorus atom. $R_{17}$ represents a vinyl, vinylbenzyl, or (meth)acryloyloxy group and preferably is a vinyl or vinylbenzyl group for a low dielectric loss tangent. f and g each independently denote 0 or 1. An example of a phosphorus flame retardant in which the $R_{16}$s form a cyclic structure together with the phosphorus atom is general formula (P1) below.

[Chem. 20]

(P1)

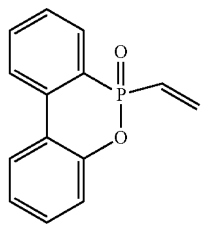

[Chem. 21]

(P-5)

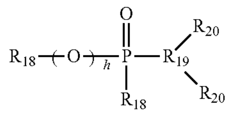

In general formula (P-5) above, the $R_{18}$s each independently represent a C1 to C12 alkyl, aryl, aralkyl, or cycloalkyl group. For heat resistance, it is preferred that the $R_{18}$s be phenyl groups. The $R_{18}$s may form a cyclic structure together with the phosphorus atom. $R_{19}$ represents a divalent group having an arylene structure and preferably is a phenyl group for heat resistance. $R_{20}$ represents a (meth)acryloyloxy, vinylbenzyl ether, or allyl ether group and preferably is a vinylbenzyl ether group for a low dielectric loss tangent. h denotes 0 or 1. An example of a phosphorus flame retardant in which the $R_{18}$s form a cyclic structure together with the phosphorus atom is general formula (P2) below.

[Chem. 22]

(P2)

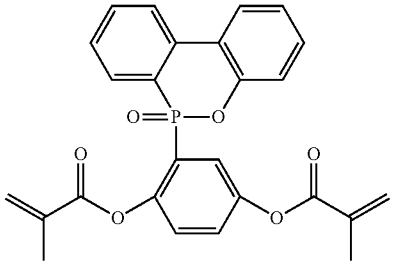

Preferably, the curable resin composition according to the present invention contains 0.05 to 300 parts by mass, more preferably 0.1 to 200 parts by mass, more preferably 1 to 100 parts by mass, even more preferably 5 to 50 parts by mass of the (C) ingredient per 100 parts by mass of the (A) ingredient. The presence of 0.05 parts by mass or more of the (C) ingredient is preferred because in that case the resulting cured product will have sufficiently high flame retardancy. Making the (C) ingredient content 300 parts by mass or less, on the other hand, brings the resulting cured product into its preferred form because in that case the associated worsening of dielectric properties is limited.

<Extra Resins and Other Ingredients>

Besides these (A), (B), (C), and (D) ingredients, the curable resin composition according to the present invention can be made with any kinds of extra resins, curing agents, and curing accelerators, for example, to an extent that they do not defeat the object of the present invention. Although the curable resin composition gives a cured product, for example upon heating, without a curing agent or curing accelerator, but if the composition contains, for example, the (D) ingredient, the manufacturer can add a separate curing agent, curing accelerator, or similar agent.

<Extra Resin>

Optionally, the curable resin composition may contain not only the (A) and (D) ingredients but also a thermoplastic resin. Examples of thermoplastic resins that can be used include styrene butadiene resins, styrene-butadiene-styrene block copolymers, styrene-isoprene-styrene resins, styrene-maleic anhydride resins, acrylonitrile butadiene resins, polybutadiene resins, and hydrogenated resin forms thereof, acrylic resins, and silicone resins. Using such a thermoplastic resin brings the cured product into its preferred form because characteristics derived from that resin can be imparted to the cured product through it. Examples of performance attributes that thermoplastic resins can contribute to imparting include formability, high-frequency characteristics, adhesiveness to conductors, heat resistance during soldering, the adjustment of glass transition temperature, the coefficient of thermal expansion, and smear removal.

<Cuing Agent>

Examples of curing agents include amine compounds, amide compounds, acid anhydride compounds, phenolic compounds, and cyanate ester compounds. One such curing agent alone or two or more in combination may be used.

<Curing Accelerator>

Various curing accelerators can be used, but examples include phosphorus compounds, tertiary amines, imidazoles, metal salts of organic acids, Lewis acids, and amine complexes. If the curable resin composition is used in semiconductor sealing material applications in particular, phosphorus compounds, such as triphenylphosphine, or imidazoles are preferred because they are superior in curability, heat resistance, electrical properties, moisture reliability, etc. One such curing accelerator can be used, or two or more can be used in combination.

If the curable resin composition is made with epoxy resin(s) as the (D) ingredient, examples of curing accelerators that can be used include TPP, TPP-K, TPP-S, and TPTP-S (Hokko Chemical Industry Co., Ltd.) (organic phosphine compounds), dicyandiamide, diaminodiphenylethane, guanylurea, amine adduct compounds, such as Novacure® (Asahi Chemical Industry Co., Ltd.) and Fujicure (Fujikasei Kogyo Co., Ltd.), 1,8-diazabicyclo[5.4.0]undecene-7, 4-dimethylaminopyridine (DMAP), benzyldimethylamine, 2,4,6-tris(dimethylaminomethyl)phenol, etc. (amines), and 2-phenylimidazole, 1-cyanoethyl-2-methylimidazole, 1-cyanoethyl-2-undecylimidazole, 1-cyanoethyl-2-phenylimidazole, 1-cyanoethyl-2-phenylimidazolium trimellitate, benzimidazole, and CUREZOL 2MZ, 2E4MZ, C11Z, C11Z-CN, C11Z-CNS, C11Z-A, 2MZ-OK, 2MA-OK, and 2PHZ (Shikoku Chemicals Corporation) (imidazoles). If maleimide resin(s) is used as the (D) ingredient, examples of curing accelerators that can be used include p-toluenesulfonic acid (acidic catalysts), triethylamine, pyridine, tributylamine, tertiary amine compounds; quaternary ammonium compounds, and imidazole compounds (amine compounds), phosphorus compounds, dicumyl peroxide, 2,5-dimethyl-2,5-bis(t-butylperoxy)hexyne-3, 2,5-dimethyl-2,5-bis(t-butylperoxy)hexane, t-butylperoxyisopropyl monocarbonate, and α,α'-bis(t-butylperoxy)diisopropylbenzene (organic peroxides), and carboxylates of manganese, cobalt, and zinc (carboxylates). If cyanate ester resin(s) is used as the (D) ingredient, examples of curing accelerators that can be used include imidazole compounds and derivatives thereof, carboxylates of manganese, cobalt, zinc, and other metals; and organometallic compounds, such as acetylacetone complexes of manganese, cobalt, zinc, and other transition metals.

<Inorganic Filler>

The curable resin composition according to the present invention can optionally contain inorganic filler. Examples of inorganic fillers include silica (fused silica and crystalline silica), alumina, barium sulfate, tale, clay, mica powder, aluminum hydroxide, magnesium hydroxide, calcium carbonate, magnesium carbonate, magnesium oxide, boron nitride, aluminum borate, barium titanate, strontium titanate, calcium titanate, magnesium titanate, bismuth titanate, titanium oxide, barium zirconate, and calcium zirconate. Surface treatment with a silane coupling agent is also allowed. If the manufacturer sets the inorganic filler content extraordinarily high, it is preferred to use fused silica. The fused silica can be used in crushed or bead form, but if the manufacturer tries to increase the fused silica content while limiting the associated increase in the melt viscosity of the material to be shaped, it is preferred to use primarily beads. If the manufacturer wants to set the silica bead content even higher, it is preferred to adjust the particle size distribution of the silica beads to an appropriate level.

<Other Additives>

The curable resin composition according to the present invention can optionally contain various additives, such as silane coupling agents, release agents, pigments, and emulsifiers.

<Cured Product>

The present invention relates to a cured product obtained by curing the above curable resin composition. The curable resin composition is obtained by mixing the above-described (A), (B), and (C) ingredients homogeneously with ingredients selected according to the purpose, such as the (D) ingredient and curing agent(s), and can be easily made into a cured product by a method similar to those known in the related art. Examples of cured products include shaped cured articles, such as a multilayer article, a cast article, an adhesive layer, a coating, and a film.

Examples of curing reactions include thermal curing and ultraviolet curing. Thermal curing, in particular, is easy to do even without a catalyst, but using the (B) ingredient helps accelerate the reaction. Besides the (B) ingredient, a polymerization initiator or a catalyst, for example, can also be used.

<Varnish>

The present invention relates to a varnish that is a dilution of the above curable resin composition in an organic solvent. The preparation of the varnish can be done by known methods; the curable resin composition can be made into a resin varnish, a solution (dilution) of the composition in an organic solvent.

<Prepreg>

The present invention relates to a prepreg having a reinforcing base material and a half-cured form of the above varnish impregnated into the reinforcing base material. Impregnating a reinforcing base material with the varnish (resin varnish) and half-curing the curable resin composition by heating the reinforcing base material impregnated with the varnish (resin varnish) (or maintaining the composition uncured) will give a prepreg.

The organic solvent can be selected from toluene, xylene, N,N-dimethylformamide, N,N-dimethylacetamide, N-methyl-2-pyrrolidone, methyl ethyl ketone (MEK), methyl isobutyl ketone, dioxane, tetrahydrofuran, etc. One selected solvent alone or a mixture of two or more can be used.

The reinforcing base material, through which the varnish (resin varnish) is spread, is, for example, a woven or nonwoven fabric made of inorganic or organic fiber, such as fiberglass, polyester fiber, or polyamide fiber, or a material like a mat or paper. One such material alone or a combination can be used.

The percentage by mass of the curable resin composition and the reinforcing base material in the prepreg is not critical, but usually, it is preferred to prepare the prepreg so that (the resin(s) in) the curable resin composition will constitute 20% to 60% by mass of the prepreg.

The conditions for the heating of the prepreg are selected as appropriate, for example according to the organic solvent, catalyst, and additives used and their amounts. Usually, however, the heating is done under conditions like a temperature of 80° C. to 220° C. and 3 minutes to 30 minutes.

<Multilayer Body>

The cured product according to the present invention may be, for example, a multilayer body having a substrate and a layer containing the cured product. A multilayer body formed with a layer containing the cured product (cured product layer) is preferred because it can be used to make, for example, a high-frequency printed circuit board by virtue of its low dielectric constant, low dielectric loss tangent, and high heat resistance.

The substrate used to make the multilayer body can be, for example, an inorganic material, such as a metal or glass, or organic material, such as plastic or wood, selected in an appropriately according to the purpose of use. Examples include E-glass, D-glass, S-glass, Q-glass, glass beads, NE-glass, L-glass, and T-glass (fiberglass), quartz (inorganic fiber), polyparaphenylene terephthalamide (Kevlar®, DuPont K.K.) and copolyparaphenylene/3,4' oxydiphenylene/terephthalamide (Technora®, Teijin Techno Products, Ltd.) (all-aromatic polyamides), 2,6-hydroxynaphthoic acid/parahydroxybenzoic acid (VECTRAN®, Kuraray Co., Ltd.) and Zxion® (KB Seiren, Ltd.) (polyesters), and polyparaphenylene benzoxazole (Xylon®, Toyobo Co., Ltd.) and polyimides (organic fibers).

As for the shape of the multilayer body, too, the multilayer body may be a flat plate, in sheet shape, or have a three-dimensional structure or be in solid shape. The multilayer body may be in any shape selected according to the purpose, such as one having curvature throughout or in part. The hardness, thickness, etc., of the substrate are not critical either. The cured product according to the present invention may be used as a substrate, and a layer of the cured product according to the present invention may be placed on it.

If the multilayer body is used to make a circuit board or semiconductor package substrate, it is preferred to place a layer of metal foil on it. Examples of metal foils include copper foil, aluminum foil, gold foil, and silver foil, and it is preferred to use copper foil because it has good workability.

The layer containing the cured product (cured product layer) of the multilayer body may be formed by coating it directly onto or shaping it directly on the substrate or may be shaped beforehand and then placed on the substrate. For direct coating, the coating technique is not critical, and examples include spraying, spin coating, dipping, roll coating, blade coating, doctor roll coating, doctor blading, curtain coating, slit coating, screen printing, and inkjet coating. For direct shaping, examples of techniques include in-mold forming, film insert molding, vacuum molding, extrusion laminating, and stamping.

Alternatively, the layer may be placed by coating the cured product according to the present invention with a precursor that can be turned into the substrate and curing the coating, or a precursor that can be turned into the substrate and the curable resin composition according to the present invention may be bonded together with one of the two elements uncured or half-cured, and then the uncured or half-cured element may be cured. The precursor that can be turned into the substrate can be of any kind; curable resin compositions, for example, can be used.

<Applications>

Because cured products obtained with the use of the curable resin composition according to the present invention are superior in flame retardancy, heat resistance, and dielectric properties, suitable applications include heat-resistant components and electronic components. Particularly suitable applications include varnishes for the production of prepregs, prepregs, circuit boards, semiconductor sealants, semiconductor devices, build-up films, build-up substrates, adhesive agents, and resist materials. Matrix resins for fiber-reinforced plastics are also a suitable application, in which the resin composition is excellent for use as a flame-retardant and highly heat-resistant prepreg. Heat-resistant or electronic components obtained in such a way are suitable for use in different applications. Examples include, but are not limited to, components for industrial machinery, components for general-purpose machinery, components for automobiles, railways, vehicles, etc., astronautical and aeronautical components, electronic and electric components, building materials, container and packaging elements, household goods, sporting and leisure goods, and enclosure elements for wind power generation.

Typical products produced using the curable resin composition according to the present invention will now be described by providing examples.

<Circuit Board>

The present invention relates to a circuit board obtained by shaping a stack of the above prepreg and copper foil by thermocompression. A specific example of how to make the curable resin composition according to the present invention into a circuit board is a method in which layers of the above prepreg are stacked by an ordinary method, copper foil is placed thereon as needed, and the resulting stack is shaped by thermocompression at 170° C. to 300° C. for 10 minutes to 3 hours under a pressure of 1 to 10 MPa.

<Semiconductor Sealant>

Preferably, a semiconductor sealant contains the above curable resin composition. A specific example of how to make the curable resin composition according to the present invention into a semiconductor sealant is a method in which the curable resin composition is fused and blended with additives including inorganic filler, optionally with a curing accelerator, using an extruder, a kneader, rollers, etc., as needed, to an extent enough that the blend will be homogeneous. The inorganic filler is usually fused silica, but if the sealant is used as a high-thermal-conductivity semiconductor sealant for power transistors and power ICs, it would be good to add crystal silica, alumina, silicon nitride, or another filler more thermally conductive than fused silica. As for the filler content, it is preferred to use 30 to 95 parts by mass of the inorganic filler per 100 parts by mass of the curable resin composition. In particular, if the manufacturer attempts to improve flame retardancy, moisture resistance, and anti-solder cracking properties and lower the coefficient of linear expansion, it is more preferred that the filler content be 70 parts by mass or more, even more preferably 80 parts by mass or more.

<Semiconductor Device>

Preferably, a semiconductor device includes a cured product obtained by curing the above semiconductor sealant by heating. A specific example of a semiconductor packaging process for making the curable resin composition according to the present invention into a semiconductor device is a method in which the semiconductor sealant is shaped by casting or using a transfer molding machine, injection molding machine, or similar equipment, and the shaped sealant is cured by heating at 50° C. to 250° C. for 2 to 10 hours.

<Build-Up Substrate>

An example of how to make the curable resin composition according to the present invention into a build-up substrate is a method in which the resin composition goes through steps 1 to 3. In step 1, the curable resin composition with any appropriate ingredients, such as rubber and filler, added thereto is coated, for example by spray coating or curtain coating, onto a circuit board having a circuit formed thereon, and the resulting coating is cured. In step 2, the circuit board with a coating of the curable resin composition thereon is perforated as needed, for example at predetermined through-hole portions, then irregularities are created in the surface of the board by treating the board with a roughening agent and washing the treated surface with hot water, and the circuit board is plated with copper or another metal. In step 3, the operations in steps 1 and 2 are repeated in order as desired, alternately building up a resin insulating layer and a conductor layer in a predetermined circuit pattern to shape a build-up substrate. In the above steps, the perforation at through-hole portions can be done after the formation of the outermost resin insulating layer. A build-up substrate can also be fabricated without the step of forming a roughened surface and plating, by half-curing the resin composition on copper foil and joining this copper foil with resin thereon, by thermocompression at 170° C. to 300° C., to a wiring board having a circuit formed thereon.

<Build-Up Film>

Preferably, a build-up film contains the above curable resin composition. An example of how to make the curable resin composition according to the present invention into a build-up film is a method in which the curable resin composition is coated onto a support film, and then the resulting coating is dried to form a resin composition layer on the support film. If the curable resin composition according to the present invention is used in making a build-up film, it is vital that the film soften under lamination temperature conditions in vacuum lamination (usually, 70° C. to 140° C.) and exhibit a degree of flowability (resin flow) high enough that the resin will plug any via holes or through holes present in the circuit board while laminating the circuit board. It is, therefore, preferred to blend ingredients as described above so that the film will display such properties.

The diameter and depth of through holes in a circuit board are usually from 0.1 to 0.5 mm and from 0.1 to 1.2 mm, respectively. Usually, therefore, it is preferred that holes in these ranges can be plugged with the resin. If both sides of a circuit board are laminated, it is desirable that the through holes be plugged to approximately ½.

A specific example of how to produce such a build-up film is a method in which the resin composition is made into a varnish by adding an organic solvent to it, then the varnish of the resin composition is coated onto the surface of a support film (Y), and the organic solvent is dried, for example by heating or hot-air blow, to form a resin composition layer (X).

Examples of preferred organic solvents for use in this method include ketones, such as acetone, methyl ethyl ketone, and cyclohexanone, acetates, such as ethyl acetate, butyl acetate, cellosolve acetate, propylene glycol monomethyl ether acetate, and carbitol acetate, carbitols, such as cellosolve and butyl carbitol, aromatic hydrocarbons, such as toluene and xylene, and dimethylformamide, dimethylacetamide, and N-methylpyrrolidone. Preferably, the percentage of the organic solvent is set so that the non-volatile content of the varnish will be from 30% to 60% by mass.

It should be noted that the thickness of the resin composition layer (X) formed usually needs to be equal to or greater than the thickness of the conductor layer. The thickness of the conductor layer of a circuit board is usually in the range of 5 to 70 μm, which means it is preferred that the resin composition layer (X) have a thickness of 10 to 100 μm. In addition, this resin composition layer (X) in the present invention may be protected with a protective film as described below. Protection with a protective film helps prevent adhesion, for example of dust, to and damage to the surface of the resin composition layer.

Examples of materials for use as the support and protective films include polyolefins, such as polyethylene, polypropylene, and polyvinyl chloride, polyesters, such as polyethylene terephthalate (PET) and polyethylene naphthalate, polycarbonates, and polyimides as well as release paper and copper foil, aluminum foil, and other metal foils. The support and protective films may be treated with matte or by corona treatment and may be treated with a release agent. The thickness of the support film is not critical, but usually is from 10 to 150 μm. Preferably, the support film is used with its thickness in the range of 25 to 50 μm. As for the protective film, it is preferred that its thickness be from 1 to 40 μm.

The support film (Y) is removed after the circuit board is laminated or after an insulating layer is formed by curing the resin by heating. Removing the support film (Y) after the resin composition layer as a component of the build-up film is cured by heating would help prevent adhesion, for example of dust, during the curing step. If the support film is removed after curing, the support film is usually treated with a release agent beforehand.

A build-up film obtained in such a way can be used to produce a multilayer printed circuit board. For example, if the resin composition layer (X) is protected with protective films, these films are removed first, and then one or both sides of a circuit board are laminated with layer(s) of the resin composition (X), for example by vacuum lamination, with the resin composition layer(s) directly on the circuit board. The lamination method may be batch lamination or may be continuous one in which a roller is used. Optionally, the build-up film and the circuit board may be heated before lamination (preheated) as needed. As for lamination conditions, it is preferred that the press temperature (lamination temperature) be from 70° C. to 140° C., it is preferred that the pressure applied be from 1 to 11 kgf/cm$^2$ ($9.8\times10^4$ to $107.9\times10^4$ N/m$^2$), and it is preferred to laminate the circuit board under a reduced air pressure of 20 mmHg (26.7 hPa) or less.

<Electrically Conductive Paste>

An example of how to make the curable resin composition according to the present invention into an electrically conductive paste is a method in which electrically conductive particles are dispersed in the composition. This electrically conductive paste can be made as a paste resin composition for circuit coupling or an anisotropic electrically conductive adhesive, for example, by changing the kind of electrically conductive particles used.

EXAMPLES

The present invention will now be described specifically by examples and comparative examples. "Parts" and "%" are by mass unless stated otherwise. It should be noted that curable resins and cured products obtained using curable resin compositions containing these curable resins and other ingredients were synthesized under the conditions presented below, and the resulting cured products were subjected to measurement and evaluation under the conditions below.

<$^1$H-NMR Measurement>

$^1$H-NMR: JEOL RESONANCE's "JNM-ECA600"

Magnetic field strength: 600 MHz

The number of scans: 32

Solvent: CDCl3

Sample concentration: 1% by mass

Figure 2:
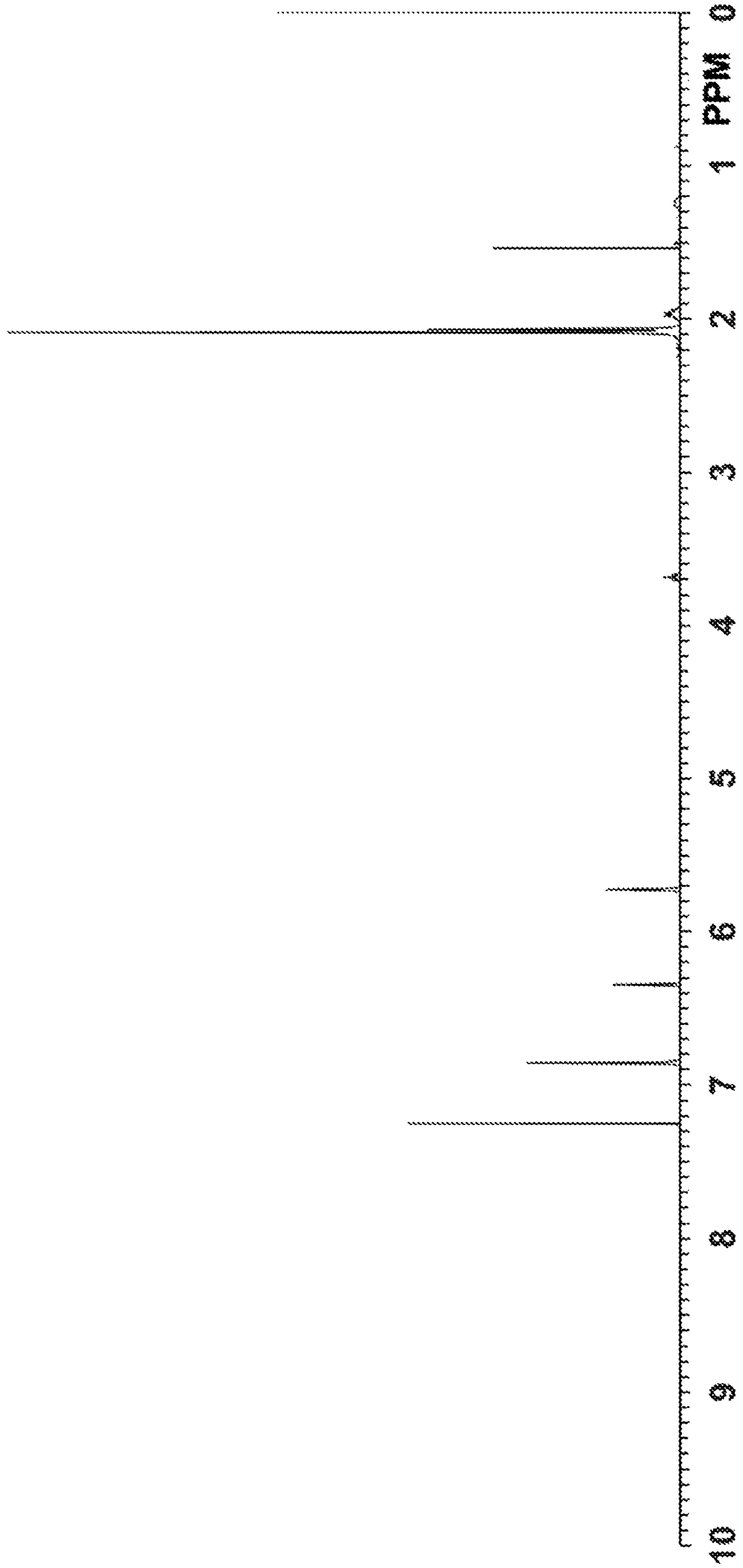
FIG. 2 is a $^1$H-NMR spectrum of a curable resin obtained in Example 2.
Figure 3:
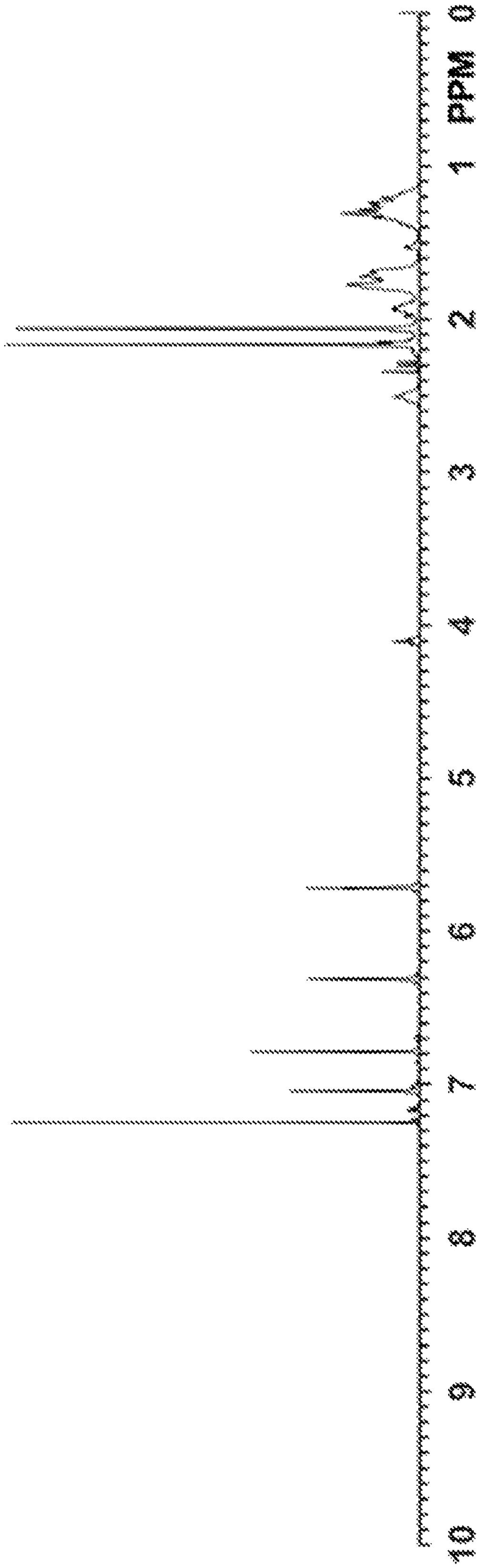
FIG. 3 is a $^1$H-NMR spectrum of a curable resin obtained in Example 13.

Through this $^1$H-NMR measurement, the synthesis of curable resins obtained by the following production processes was confirmed based on the disappearance of the peak for aldehyde (see FIG. 1, which is from Example 1, FIG. 2, from Example 2, and FIG. 3, from Example 13). In the Examples and Comparative Examples other than Examples 1, 2, and 13, too, the synthesis of a curable resin was likewise confirmed through this $^1$H-NMR measurement (not illustrated).

Example 1

A 100-ml two-neck flask equipped with a condenser was charged with 73 g (0.60 mol) of 2,6-xylenol and 20 g (0.15 mol) of terephthalaldehyde, and the compounds were dissolved in 300 ml of 2-ethoxyethanol. After 10 g of 96% sulfuric acid was added with cooling in an ice bath, the mixture was allowed to react for 2 hours while being stirred, with the flask in an oil bath at 80° C. After the end of the reaction, water was added to the resulting reaction mixture (reaction solution) to cause a crude product to precipitate. The collected crude product was dissolved in acetone, and water was added again to make the product reprecipitate. The precipitate was isolated by filtration and dried in a vacuum, giving 62 g (0.11 mol) of an intermediate phenolic compound.

In a 200-mL flask fitted with a thermometer, a condenser, and a stirrer, 80 g of toluene and 62 g (0.11 mol) of the intermediate phenolic compound were mixed together and heated to approximately 85° C. A 0.55-g (0.0045-mol) sample of dimethylaminopyridine was added. After the solids dissolved completely, 88.7 g (0.58 mol) of methacrylic anhydride was added gradually. The resulting solution was maintained in a state of 85° C. for 3 hours while being mixed continuously. Then the resulting solution was cooled to room temperature (25° C.) and added dropwise to 360 g of hexane in a 1-L beaker over 30 minutes, with the hexane stirred vigorously with a magnetic stirrer. The resulting precipitate was collected by vacuum filtration and then dried, yielding 38 g of a curable resin having the structural formula below. $^1$H-NMR measurement was performed (see FIG. 1) to determine the structure of this product curable resin.

[Chem. 23]

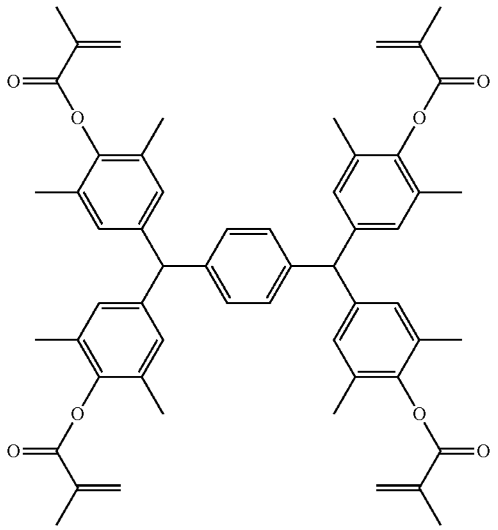

Example 2

A 200-ml three-neck flask equipped with a condenser was charged with 73.7 g (0.55 mol) of 2,6-xylenol and 53.7 g of 96% sulfuric acid, and the compounds were dissolved in 30 ml of methanol under nitrogen flow. The solution was heated in an oil bath at 70° C., 25 g (0.125 mol) of a 50% aqueous solution of glutaraldehyde was added over 6 hours with stirring, and then the mixture was allowed to react for 12 hours while being stirred. After the end of the reaction, the resulting reaction mixture (reaction solution) was cooled to room temperature (25° C.), 200 ml of toluene was added to this reaction solution, and the resulting mixture was washed using 200 mL of water. The resulting organic layer was poured into 500 mL of hexane thereafter, and the precipitated solids were isolated by filtration and dried in a vacuum, giving 22 g (0.039 mol) of an intermediate phenolic compound.

In a 200-mL flask fitted with a thermometer, a condenser, and a stirrer, 20 g of toluene and 22 g (0.039 mol) of the intermediate phenolic compound were mixed together and heated to approximately 85° C. A 0.19-g (0.0016-mol) sample of dimethylaminopyridine was added. After the solids dissolved completely, 38.5 g (0.25 mol) of methacrylic anhydride was added gradually. The resulting solution was maintained in a state of 85° C. for 3 hours while being mixed continuously. Then the resulting solution was cooled to room temperature (25° C.) and added dropwise to 360 g of hexane in a 1-L beaker over 30 minutes, with the hexane stirred vigorously with a magnetic stirrer. The resulting precipitate was collected by vacuum filtration and then dried, yielding 38 g of a curable resin having the structural formula below. $^1$H-NMR measurement was performed (see FIG. 2) to determine the structure of this product curable resin.

[Chem. 24]

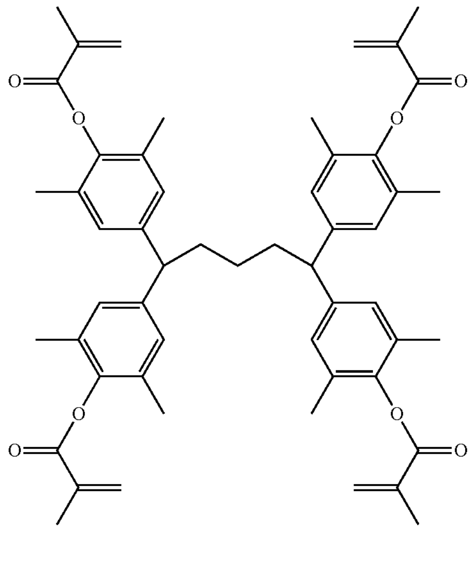

Example 3

A curable resin having the structural formula below was obtained by carrying out synthesis in the same way as in Example 2 above, except that the 50% aqueous solution of glutaraldehyde in Example 2 above was changed to 18.1 g (0.125 mol) of a 40% glyoxal solution.

[Chem. 25]

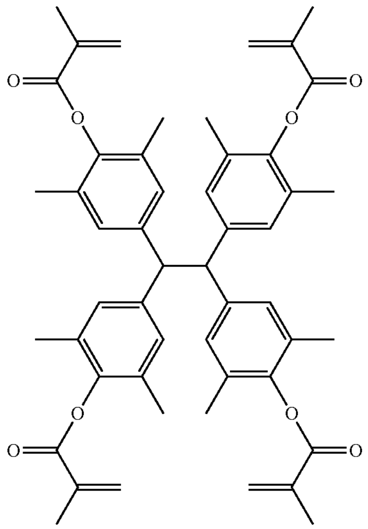

Example 4

A curable resin having the structural formula below was obtained by carrying out synthesis in the same way as in Example 2 above, except that the amount of 2,6-xylenol in Example 2 above was changed to 50.9 g (0.38 mol) and that the 50% aqueous solution of glutaraldehyde was changed to 8.8 g (0.125 mol) of crotonaldehyde.

[Chem. 26]

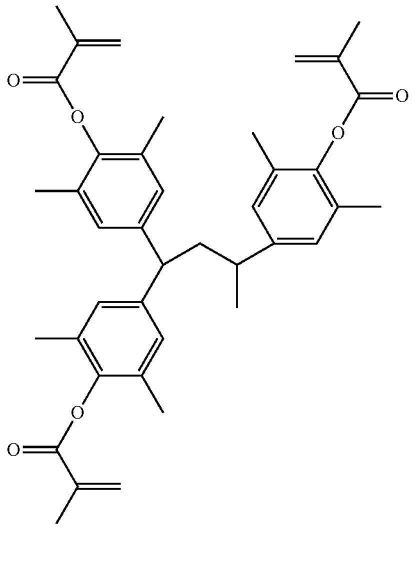

Example 5

In a 200-mL flask fitted with a thermometer, a condenser, and a stirrer, 20 g of toluene and 30.2 g (0.039 mol) of 2,4,6-tris(3',5'-tert-butyl-4'-hydroxybenzyl)mesitylene were mixed together and heated to approximately 85° C. A 0.19-g (0.0016-mol) sample of dimethylaminopyridine was added. After the solids dissolved completely, 38.5 g (0.25 mol) of methacrylic anhydride was added gradually. The resulting solution was maintained in a state of 85° C. for 3 hours while being mixed continuously. Then the resulting solution was cooled to room temperature (25° C.) and added dropwise to 360 g of hexane in a 1-L beaker over 30 minutes, with the hexane stirred vigorously with a magnetic stirrer. The resulting precipitate was collected by vacuum filtration and then dried, yielding a curable resin having the structural formula below.

[Chem. 27]

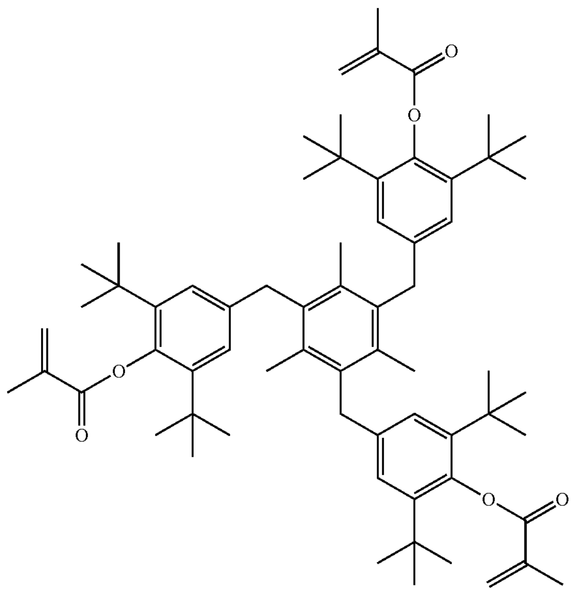

Example 6

A curable resin having the structural formula below was obtained by carrying out synthesis in the same way as in Example 2 above, except that the 2,6-xylenol in Example 2 above was changed to 96.9 g (0.55 mol) of 2-cyclohexylphenol.

[Chem. 28]

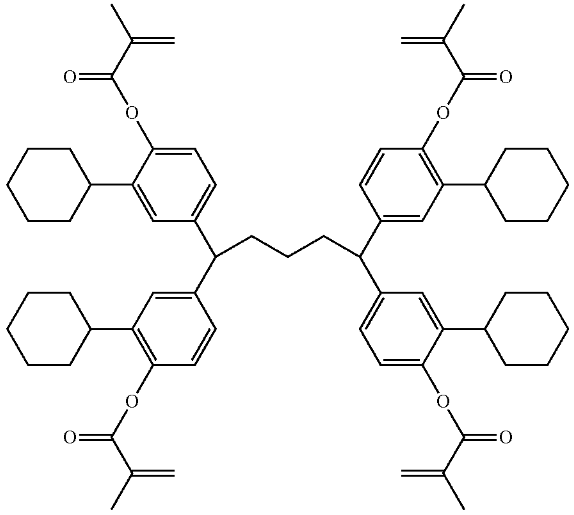

Example 7

A curable resin having the structural formula below was obtained by carrying out synthesis in the same way as in Example 2 above, except that the 2,6-xylenol in Example 2 above was changed to 93.6 g (0.55 mol) of 2-phenylphenol.

[Chem. 29]

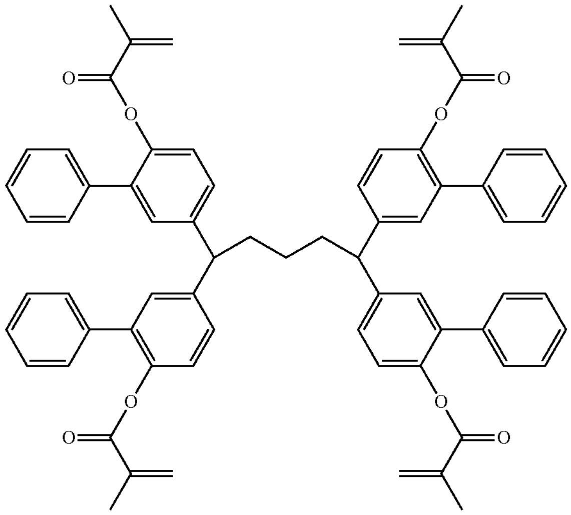

Example 8

A curable resin having the structural formula below was obtained by carrying out synthesis in the same way as in Example 2 above, except that the 2,6-xylenol in Example 2 above was changed to 67.2 g (0.55 mol) of 2-ethylphenol.

[Chem. 30]

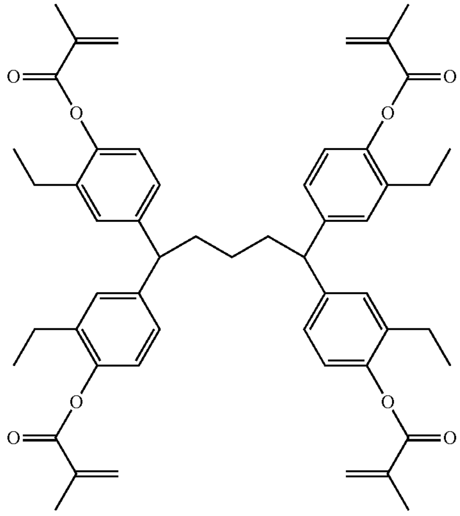

Example 9

A curable resin having the structural formula below was obtained by carrying out synthesis in the same way as in Example 2 above, except that the 2,6-xylenol in Example 2 above was changed to 74.9 g (0.55 mol) of 2-isopropylphenol.

[Chem. 31]

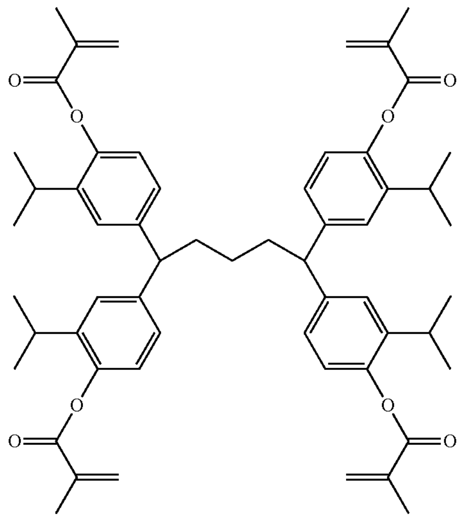

Example 10

A curable resin having the structural formula below was obtained by carrying out synthesis in the same way as in Example 2 above, except that the 2,6-xylenol in Example 2 above was changed to 2,5-xylenol.

[Chem. 32]

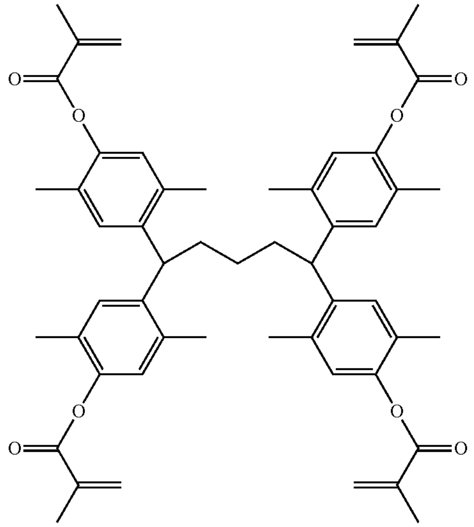

Example 11

A curable resin having the structural formula below was obtained by carrying out synthesis in the same way as in Example 2 above, except that the 2,6-xylenol in Example 2 above was changed to 74.9 g (0.55 mol) of 2,3,6-trimethylphenol.

[Chem. 33]

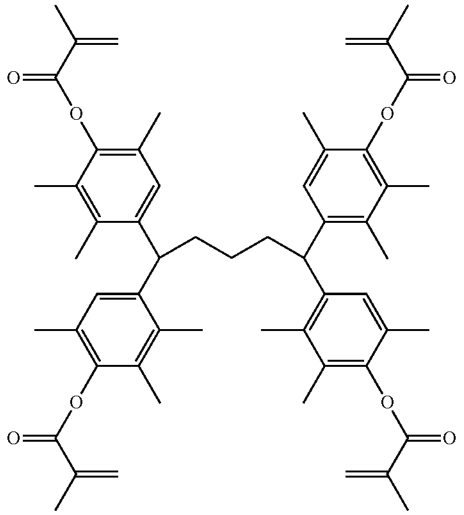

Example 12

A curable resin having the structural formula below was obtained by carrying out synthesis in the same way as in Example 2 above, except that the 2,6-xylenol in Example 2 above was changed to 2,4-xylenol.

[Chem. 34]

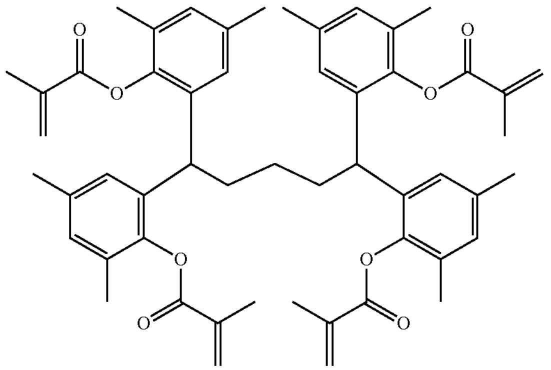

Example 13

A curable resin having the structural formula below was obtained by carrying out synthesis in the same way as in Example 2 above, except that the 2,6-xylenol in Example 2 above was changed to 104.7 g (0.55 mol) of 2-cyclohexyl-5-methylphenol. $^{1}$H-NMR measurement was performed (see FIG. 3) to determine the structure of this product curable resin.

[Chem. 35]

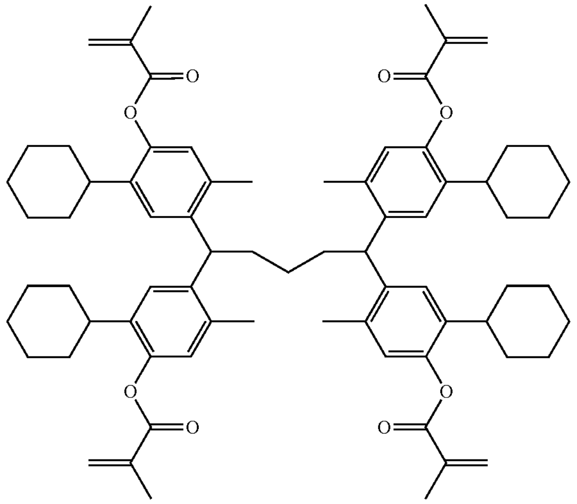

Example 14

A curable resin having the structural formula below was obtained by carrying out synthesis in the same way as in Example 13 above, except that the chloromethylstyrene in Example 13 above was changed to 26 g (0.34 mol) of allyl chloride.

[Chem. 36]

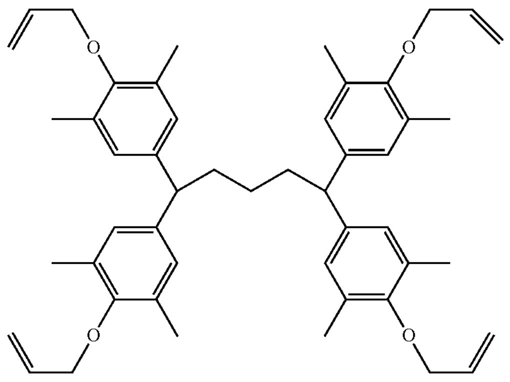

Example 15

A 200-ml three-neck flask equipped with a condenser was charged with 73.7 g (0.55 mol) of 2,6-xylenol and 53.7 g of 96% sulfuric acid, and the compounds were dissolved in 30 ml of methanol under nitrogen flow. The solution was heated in an oil bath at 70° C., 25 g (0.125 mol) of a 50% aqueous solution of glutaraldehyde was added over 6 hours with stirring, and then the mixture was allowed to react for 12 hours while being stirred. After the end of the reaction, the resulting reaction mixture (reaction solution) was cooled to room temperature (25° C.), 200 ml of toluene was added to this reaction solution, and the resulting mixture was washed using 200 mL of water. The resulting organic layer was poured into 500 mL of hexane thereafter, and the precipitated solids were isolated by filtration and dried in a vacuum, giving 22 g (0.039 mol) of an intermediate phenolic compound.

Into a 300-mL flask fitted with a thermometer, a condenser, and a stirrer, 22 g (0.039 mol) of the resulting intermediate phenolic compound, 0.046 g (0.00025 mol) of 2,4-dinitrophenol (2,4-DNP), 5.9 g (0.018 mol) of tetrabutylammonium bromide (TBAB), 52.3 g (0.34 mol) of chloromethylstyrene, and 100 g of methyl ethyl ketone were added and heated to approximately 75° C. with stirring. Then a 48%-NaOHaq was added dropwise to the reactor over 20 minutes, with the reactor kept at 75° C. After the end of the addition, stirring was continued at 75° C. for another 4 h. After the 4 h, the mixture was cooled to room temperature (25° C.), 100 g of toluene was added, and then 10% HCl was added to neutralize the mixture. The water layer was isolated by separation thereafter, and then separation and washing with 300 m of water was repeated three times. The resulting organic layer was concentrated by evaporation, and methanol was added to make the product reprecipitate. The precipitate was collected by filtration and dried in a vacuum, giving a curable resin having the structural formula below.

[Chem. 37]

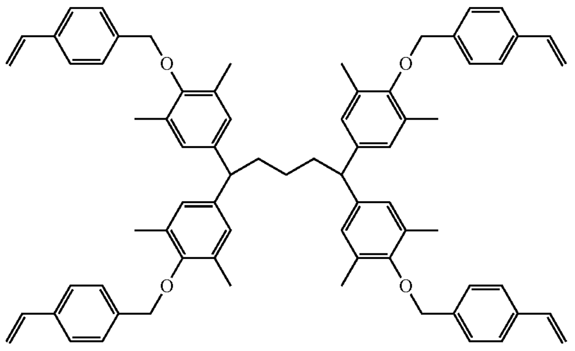

Comparative Example 1

A curable resin having the structural formula below was obtained by carrying out synthesis in the same way as in Example 12 above, except that the 2,4,6-tris(3',5'-tert-butyl-4'-hydroxybenzyl)mesitylene in Example 12 above was changed to 16.8 g (0.059 mol) of 2,2-bis(4-hydroxy-3,5-dimethylphenyl)propane.

[Chem. 38]

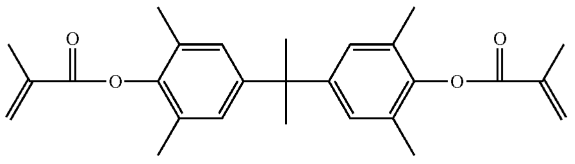

Comparative Example 2

A curable resin having the structural formula below was obtained by carrying out synthesis in the same way as in Example 1 above, except that the terephthalaldehyde in Example 1 above was changed to 16.2 g (0.1 mol) of benzene-1,3,5-tricarbaldehyde.

[Chem. 39]

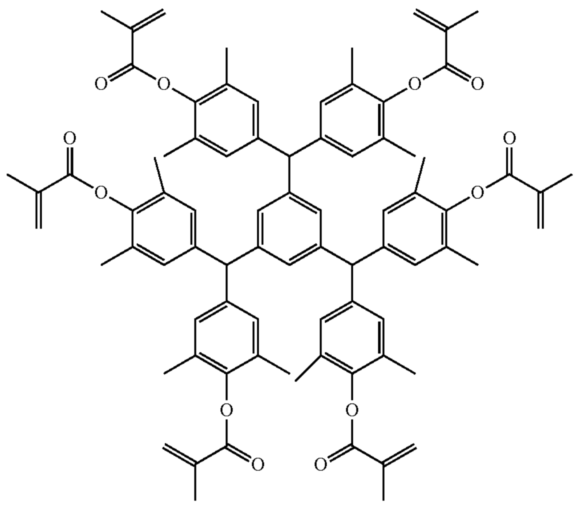

Comparative Example 3

A curable resin having the structural formula below was obtained by carrying out synthesis in the same way as in Example 1 above, except that the 2,6-xylenol in Example 1 above was changed to 56.5 g (0.60 mol) of phenol.

[Chem. 40]

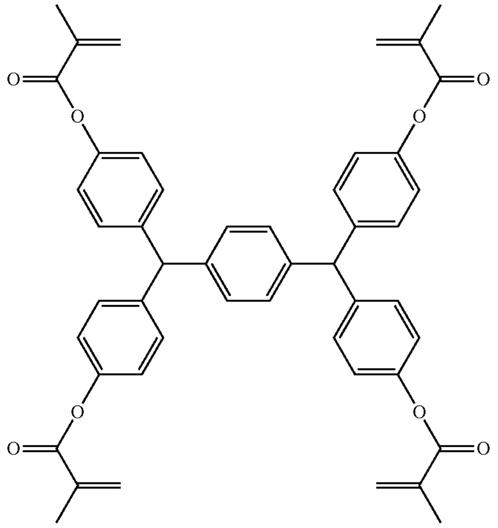

Comparative Example 4

In a 200-mL flask fitted with a thermometer, a condenser, and a stirrer, 20 g of toluene and 45.9 g (0.039 mol) of pentaerythritol tetrakis[3-(3,5-di-tert-butyl-4-hydroxyphenyl)propionate] were mixed together and heated to approximately 85° C. A 0.19-g (0.0016-mol) sample of dimethylaminopyridine was added. After the solids dissolved completely, 38.5 g (0.25 mol) of methacrylic anhydride was added gradually. The resulting solution was maintained in a state of 85° C. for 3 hours while being mixed continuously. Then the resulting solution was cooled to room temperature (25° C.) and added dropwise to 360 g of hexane in a 1-L beaker over 30 minutes, with the hexane stirred vigorously with a magnetic stirrer. The resulting precipitate was collected by vacuum filtration and then dried, yielding a curable resin having the structural formula below.

[Chem. 41]

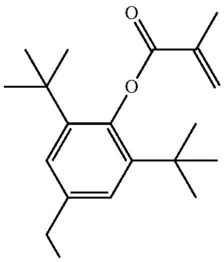

-continued

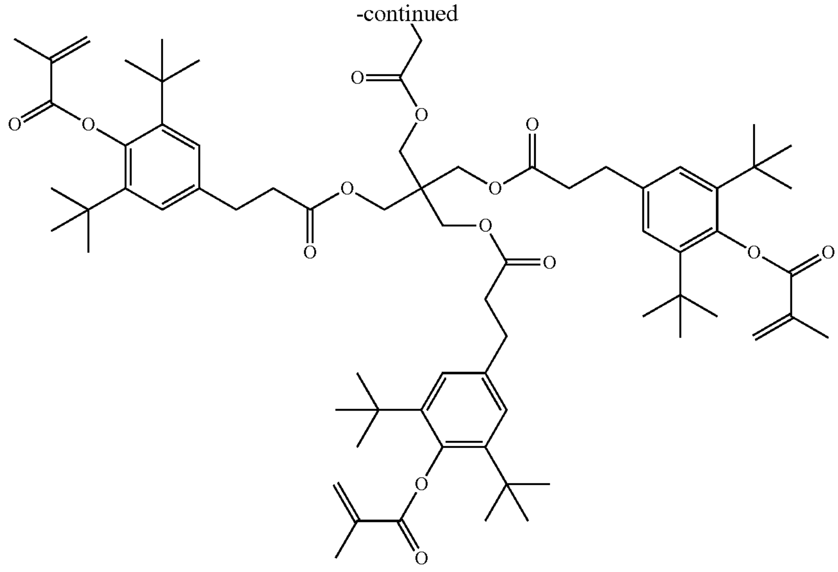

<Production of Resin Films (Cured Product)>

The curable resins (solid powders) obtained in the Examples and Comparative Examples were put into 5-cm by 5-cm square molds, and the molds were sandwiched between stainless steel plates and set in a vacuum press. Under atmospheric pressure and room temperature conditions, the workpieces were pressurized to 1.5 MPa. After the pressure was then reduced to 10 torr, the workpieces were warmed to the thermosetting temperature of the resins plus 50° C. over 30 minutes. The workpieces were allowed to stand for 2 hours and then cooled slowly to room temperature (25° C.). As a result, uniform resin films each having an average film thickness of 100 μm (cured product) were produced.

It should be noted that in Example 14 (X was an allyl ether group), homopolymerization of the curable resin alone (crosslinking) does not proceed. In this Example, therefore, only the production of the curable resin was confirmed, without the following evaluations based on a resin film (cured product).

<Heat Resistance Evaluation (Glass Transition Temperature)>

The resulting resin films (cured product) were analyzed using PerkinElmer's DSC (Pyris Diamond) under temperature elevation conditions of 20° C./min from room temperature (25° C.). After the exothermic peak temperature (thermosetting temperature) was observed, the film was maintained at a 50° C. higher temperature for 30 minutes. Then the sample was cooled to room temperature (25° C.) under temperature lowering conditions of 20° C./min and heated again under temperature elevation conditions of 20° C./min. During this, the temperature of the glass transition point (Tg) (° C.) of the resin film (cured product) was measured. A temperature of the glass transition point (Tg) of 100° C. or above is practically acceptable. Preferably, the Tg is 150° C. or above.

<Heat Resistance Evaluation (5% weight loss temperature)>

The 5% weight loss temperature (Td5) was measured using Rigaku Corporation's TG-DTA (TG-8120) at a temperature elevation rate of 20° C./min under a 20 mL/min nitrogen stream. A 5% weight loss temperature (Td5) of 300° C. or above is practically acceptable. Preferably, the Td5 is 350° C. or above.

<Dielectric Properties Evaluation>

The in-plane dielectric properties of the resulting resin films (cured product) were evaluated by measuring the dielectric constant and dielectric loss tangent at a frequency of 10 GHz by the split post dielectric resonator technique using Keysight Technologies' network analyzer N5247A. A dielectric loss tangent of $10\times10^{-3}$ or lower is practically acceptable. Preferably, the dielectric loss tangent is $3.0\times10^{-3}$ or lower, more preferably $2.5\times10^{-3}$ or lower. A dielectric constant of 3.0 or less is practically acceptable. Preferably, it is preferred that the dielectric constant be 2.7 or less, more preferably 2.5 or less.

TABLE 1

| Evaluation | Examples | | | | | | | | | | | | | | Comparative Examples | | | |
|---|---|---|---|---|---|---|---|---|---|---|---|---|---|---|---|---|---|---|
| results | 1 | 2 | 3 | 4 | 5 | 6 | 7 | 8 | 9 | 10 | 11 | 12 | 13 | 15 | 1 | 2 | 3 | 4 |
| Dielectric loss tangent ($\times10^{-3}$) | 2.9 | 2.0 | 2.5 | 2.2 | 2.8 | 1.9 | 2.2 | 2.0 | 1.9 | 1.9 | 1.7 | 2.0 | 1.9 | 3.0 | 3.2 | Film production failed | 15.1 | 11.0 |
| Dielectric constant | 2.6 | 2.3 | 2.3 | 2.2 | 2.6 | 2.1 | 2.3 | 2.2 | 2.1 | 2.2 | 2.0 | 2.3 | 2.2 | 2.5 | 2.8 | | 2.8 | 3.1 |
| Tg (° C.) | 210 | 190 | 200 | 140 | 148 | 200 | 210 | 200 | 200 | 190 | 195 | 190 | 200 | 185 | 90 | 280 | 190 | 95 |
| Td5 (° C.) | 390 | 375 | 380 | 380 | 340 | 375 | 385 | 380 | 375 | 380 | 380 | 345 | 375 | 380 | 370 | 370 | 370 | 340 |

<Preparation of Curable Resin Compositions>

Curable resin compositions were obtained by blending curable resins obtained in the above Examples with other ingredients according to the formulae presented in Table 2 and 3 (raw materials and amounts). A specific description of the curable resins in Tables 2 and 3 is as follows: the curable resin obtained in Example 2 was named curable resin (A1), the curable resin obtained in Example 13 was named curable resin (A2), and the curable resin obtained in Example 15 was named curable resin (A3).

For comparison purposes, a commercially available 4,4'-isopropylidenediphenol dimethacrylate (Sigma Aldrich), having the following structural formula, was used as curable resin (A4).

[Chem. 42]

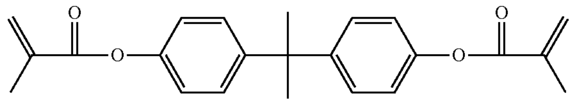

These curable resin compositions were used to prepare samples for evaluation (resin films (cured product)) based on the conditions (temperatures, durations, etc.) described below, and these samples were evaluated as examples and comparative examples.

<Production of Resin Films (Cured Product)>

The curable resin compositions blended as in Tables 2 and 3 below were put into 10-cm by 10-cm square molds, and the molds were sandwiched between stainless steel plates and set in a vacuum press. Under atmospheric pressure and 30° C. conditions, the workpieces were pressurized to 1.5 MPa. After the pressure was then reduced to 10 torr, the workpieces were warmed to 100° C. over 30 minutes and allowed to stand for 1 hour. Then the workpieces were warmed to 220° C. over 30 minutes and allowed to stand for 2 hours. The workpieces were cooled slowly to room temperature (25° C.) thereafter. Uniform resin films each having an average film thickness of 100 μm (cured product) were produced.

<Heat Resistance Evaluation (Glass Transition Temperature)>

The resulting resin films (cured product) were analyzed using PerkinElmer's DSC (Pyris Diamond) under temperature elevation conditions of 20° C./min from room temperature (25° C.). After the exothermic peak temperature (thermosetting temperature) was observed, the film was maintained at a 50° C. higher temperature for 30 minutes. Then the sample was cooled to room temperature (25° C.) under temperature lowering conditions of 20° C./min and heated again under temperature elevation conditions of 20° C./min. During this, the temperature of the glass transition point (Tg) (° C.) of the resin film (cured product) was measured. A temperature of the glass transition point (Tg) of 100° C. or above is practically acceptable. Preferably, the Tg is 150° C. or above, more preferably 200° C. or above.

<Heat Resistance Evaluation (10% Weight Loss Temperature)>

The 10% weight loss temperature (Td10) of the resulting resin films (cured product) was measured using Rigaku Corporation's TG-DTA (TG-8120) at a temperature elevation rate of 20° C./min under a 20 mL/min nitrogen stream. A 10% weight loss temperature of 400° C. or above is practically acceptable. Preferably, the Td10 is 410° C. or above, more preferably 420° C. or above.

<Dielectric Properties Evaluation>

The in-plane dielectric properties of the resulting resin films (cured product) were evaluated by measuring the dielectric constant and dielectric loss tangent at a frequency of 10 GHz by the split post dielectric resonator technique using Keysight Technologies' network analyzer N5247A. A dielectric loss tangent of $10.0\times10^{-3}$ or lower is practically acceptable. Preferably, the dielectric loss tangent is $3.0\times10^{-3}$ or lower, more preferably $2.5\times10^{-3}$ or lower. A dielectric constant of 3.0 or less is practically acceptable. Preferably, it is preferred that the dielectric constant be 2.7 or less, more preferably 2.5 or less.

<Flame Retardancy Evaluation>

The resin films were cut into strips measuring 13 mm wide by 100 mm long, and these strips were used as test specimens for flame retardancy evaluation. The UL94 20-mm vertical burning test was performed, and flame retardancy was graded according to the criteria below. A flammability class of V-1 is practically acceptable. Preferably, the flammability class is V-0.

○: UL94 V-0

Δ: UL94 V-1 x: Worse than UL94 V-1

The details of the abbreviations in Tables 2 and 3 below are as follows.

V5: Katayama Chemical Industries Co., Ltd.'s V5 (9,10-dihydro-9-oxa-10-vinyl-10-phosphaphenanthrene-10-oxide)

OP930: Clariant Japan K.K.'s OP930 (aluminum tris (diethyl phosphinate))

PX-200: Daihachi Chemical Industry Co., Ltd.'s PX-200 (resorcinol bis(di-2,6-xylenyl phosphate)) agent DT-4000: Lonza Japan K.K.'s DT-4000 (dicyclopentadiene cyanate resin), SA9000: SABIC Japan LLC's SA9000 (polyphenylene ether resin terminally modified with methacryloyl)

BMI-5100: Daiwakasei Industry Co., Ltd.'s BMI-5100 (3,3'-dimethyl-5,5'-diethyl-4,4'-diphenylmethane bismaleimide)

TABLE 2

| | | Example 16 | Example 17 | Example 18 | Example 19 | Example 20 | Example 21 |
|---|---|---|---|---|---|---|---|
| A | A1 | 100 | 100 | 100 | 100 | 100 | 100 |
| | A2 | | | | | | |
| | A3 | | | | | | |
| | A4 | | | | | | |
| B | α,α'-bis(t-butylperoxy)diisopropylbenzene | 5 | | | 5 | 5 | 5 |
| | 2,5-Dimethyl-2,5-di(t-butylperoxy)hexane | | 5 | | | | |
| | 1,1-Bis(t-butylperoxy)cyclohexane | | | 5 | | | |

TABLE 2-continued

| | | | | | | | |
|---|---|---|---|---|---|---|---|
| C | V5 | 20 | 20 | 20 | | | |
| | OP930 | | | | 20 | | |
| | PX-200 | | | | | 20 | |
| | 9,10-Dihydro-9-oxa-10-phosphaphenanthrene-10-oxide | | | | | | 20 |
| D | DT-4000 | | | | | | |
| | SA9000 | | | | | | |
| | BMI-5100 | | | | | | |
| | Triallyl isocyanurate | | | | | | |
| Performance | Dielectric loss tangent ($\times 10^{-3}$) | 2.4 | 2.4 | 2.4 | 2.4 | 2.5 | 5.2 |
| | Dielectric constant | 2.5 | 2.5 | 2.5 | 2.5 | 2.5 | 3.0 |
| | Temperature of glass transition point (° C.) | 200 | 200 | 195 | 200 | 200 | 195 |
| | 10% weight loss temperature (° C.) | 420 | 422 | 400 | 420 | 422 | 410 |
| | Flame retardancy | ○ | ○ | ○ | ○ | ○ | ○ |

| | | Example 22 | Example 23 | Example 24 | Example 25 | Example 26 | Example 27 |
|---|---|---|---|---|---|---|---|
| A | A1 | 100 | 100 | 100 | 100 | 100 | 100 |
| | A2 | | | | | | |
| | A3 | | | | | | |
| | A4 | | | | | | |
| B | α,α'-bis(t-butylperoxy)diisopropylbenzene | 0.01 | 0.1 | 10 | 20 | 25 | 5 |
| | 2,5-Dimethyl-2,5-di(t-butylperoxy)hexane | | | | | | |
| | 1,1-Bis(t-butylperoxy)cyclohexane | | | | | | |
| C | V5 | 20 | 20 | 20 | 20 | 20 | 0.1 |
| | OP930 | | | | | | |
| | PX-200 | | | | | | |
| | 9,10-Dihydro-9-oxa-10-phosphaphenanthrene-10-oxide | | | | | | |
| D | DT-4000 | | | | | | |
| | SA9000 | | | | | | |
| | BMI-5100 | | | | | | |
| | Triallyl isocyanurate | | | | | | |
| Performance | Dielectric loss tangent ($\times 10^{-3}$) | 2.2 | 2.2 | 2.5 | 2.6 | 2.8 | 2.2 |
| | Dielectric constant | 2.4 | 2.4 | 2.5 | 2.6 | 2.7 | 2.4 |
| | Temperature of glass transition point (° C.) | 195 | 200 | 202 | 200 | 200 | 200 |
| | 10% weight loss temperature (° C.) | 405 | 410 | 425 | 425 | 425 | 420 |
| | Flame retardancy | ○ | ○ | ○ | ○ | ○ | Δ |

TABLE 3

| | | Example 28 | Example 29 | Example 30 | Example 31 | Example 32 | Example 33 | Example 34 | Example 35 |
|---|---|---|---|---|---|---|---|---|---|
| A | A1 | 100 | 100 | 100 | 100 | | | 100 | 100 |
| | A2 | | | | | 100 | | | |
| | A3 | | | | | | 100 | | |
| | A4 | | | | | | | | |
| B | α,α'-bis(t-butylperoxy)diisopropylbenzene | 5 | 5 | 5 | 5 | 5 | 5 | 5 | 5 |
| | 2,5-Dimethyl-2,5-di(t-butylperoxy)hexane | | | | | | | | |
| | 1,1-Bis(t-butylperoxy)cyclohexane | | | | | | | | |
| C | V5 | 1 | 50 | 100 | 200 | 20 | 20 | 20 | 20 |
| | OP930 | | | | | | | | |
| | PX-200 | | | | | | | | |
| | 9,10-Dihydro-9-oxa-10-phosphaphenanthrene-10-oxide | | | | | | | | |
| D | DT-4000 | | | | | | | 50 | |
| | SA9000 | | | | | | | | 50 |
| | BMI-5100 | | | | | | | | |
| | Triallyl isocyanurate | | | | | | | | |

TABLE 3-continued

| | | | | | | | | | |
|---|---|---|---|---|---|---|---|---|---|
| Performance | Dielectric loss tangent ($\times 10^{-3}$) | 2.2 | 2.4 | 3.0 | 3.0 | 2.0 | 3.0 | 2.4 | 2.4 |
| | Dielectric constant | 2.4 | 2.5 | 2.7 | 2.8 | 2.4 | 2.6 | 2.5 | 2.5 |
| | Temperature of glass transition point (° C.) | 200 | 200 | 190 | 180 | 205 | 190 | 210 | 205 |
| | 10% weight loss temperature (° C.) | 420 | 420 | 410 | 410 | 420 | 420 | 420 | 425 |
| | Flame retardancy | ○ | ○ | ○ | ○ | ○ | ○ | ○ | ○ |

| | | Example 36 | Example 37 | Comparative Example 5 | Comparative Example 6 | Comparative Example 7 | Comparative Example 8 |
|---|---|---|---|---|---|---|---|
| A | A1 | 100 | 100 | 100 | 100 | 100 | |
| | A2 | | | | | | |
| | A3 | | | | | | |
| | A4 | | | | | | 100 |
| B | α,α'-bis(t-butylperoxy)diisopropylbenzene | 5 | 5 | | 5 | | 5 |
| | 2,5-Dimethyl-2,5-di(t-butylperoxy)hexane | | | | | | |
| | 1,1-Bis(t-butylperoxy)cyclohexane | | | | | | |
| C | V5 | 20 | 20 | | | 20 | 20 |
| | OP930 | | | | | | |
| | PX-200 | | | | | | |
| | 9,10-Dihydro-9-oxa-10-phosphaphenanthrene-10-oxide | | | | | | |
| D | DT-4000 | | | | | | |
| | SA9000 | | | | | | |
| | BMI-5100 | 50 | | | | | |
| | Triallyl isocyanurate | | 50 | | | | |
| Performance | Dielectric loss tangent ($\times 10^{-3}$) | 2.3 | 2.4 | 2.0 | 2.2 | 2.4 | 18 |
| | Dielectric constant | 2.5 | 2.5 | 2.3 | 2.4 | 2.5 | 3.0 |
| | Temperature of glass transition point (° C.) | 210 | 220 | 190 | 198 | 190 | 90 |
| | 10% weight loss temperature (° C.) | 423 | 420 | 380 | 400 | 345 | 380 |
| | Flame retardancy | ○ | ○ | x | x | Δ | ○ |

Note) In Tables 2 and 3 above, the amounts of ingredients are in the unit of "parts" unless stated otherwise.

The evaluation results in Table 1 above confirmed that in the Examples, the cured product obtained using the curable resin helps attempt to combine heat resistance with low dielectric properties therewith; the cured product was at a practically acceptable level.

The evaluation results in Table 1 also revealed that the cured product in Comparative Example 1, in which the resin had only two crosslinking groups X, was inferior in heat resistance with a low glass transition temperature (Tg). In Comparative Example 2, in which the number of crosslinking groups was six, heat resistance was demonstrated by a high Tg, but at the same time the cured product was found to be practically unacceptable; it was inferior in flexibility and resistance to brittle fracture and failed to form a resin film as a sample for evaluation. In Comparative Example 3, in which the curable resin had no Ra substituent in its structure, the dielectric loss tangent was very high as a result of little steric hindrance and the resulting high molecular mobility. In Comparative Example 4, in which the curable resin had an ester group (oxygen bonds) in its central structure, the dielectric loss tangent and the dielectric constant were high. The cured product in this Comparative Example, furthermore, was found to be inferior in heat resistance with a low Tg; the crosslink density was low because the curable resin had as many as 17 carbon atoms in its central structure (corresponding to Z). In addition, in Comparative Example 4, the 5% weight loss temperature (Td5) tended to be low; the curable resin was prone to thermal decomposition when heated because of having a tert-butyl group as an Ra substituent in its structure.

The evaluation results in Tables 2 and 3 above confirmed that in all Examples, the cured product obtained using the desired curable resin composition helps attempt to improve flame retardancy, heat resistance, and low dielectric properties therewith; the cured product was at a practically acceptable level.

The evaluation results in Table 3 above also revealed that in the Comparative Examples, the curable resin composition failed to give a cured product meeting the flame retardancy, heat resistance, and low dielectric properties requirements all at once because: in Comparative Example 5, the cured product was produced using a curable resin composition made only with the (A) ingredient; in Comparative Example 6, the cured product was produced using a curable resin composition made with the (A) and (B) ingredients; in Comparative Example 7, the cured product was produced using a curable resin composition made only with the (A) and (C) ingredients; and in Comparative Example 8, the cured product was produced using a curable resin composition made with a curable resin having an undesired structure. In particular, in Comparative Examples 5 and 7, in which the resin composition was made without the (B) ingredient, or without a radical polymerization initiator, the cured product was found to be inferior in heat resistance with a weight loss upon heating at high temperatures due to low reactivity. In Comparative Examples 5 and 6, in which the resin composition contained no (C) ingredient, or no flame retardant, the cured product was found to be inferior in flame retardancy. In Comparative Example 8, in which a curable resin having an undesired structure was used instead of the (A) ingredient, the dielectric loss tangent was very high due to high molecular mobility of the polar crosslinking groups, and the cured product was found to be inferior in heat resistance, too, because the number of crosslinking groups was two.

INDUSTRIAL APPLICABILITY

Superior in flame retardancy, heat resistance, and low dielectric properties, the curable resin according to the present invention and a cured product obtained using a curable resin composition containing this curable resin are suitable for application to heat-resistant or electronic components. Particularly suitable applications include materials like prepregs, circuit boards, build-up films, and build-up substrates as well as adhesive agents and resist materials. Matrix resins for fiber-reinforced plastics are also a suitable application, in which the curable resin is good for use as a high heat-resistance prepreg.

What is claimed is:

1. A curable resin represented by general formula (1), $$Z-[Y]_n \quad (1)$$

In general formula (1) above, Z is a C2 to C15 hydrocarbon, Y is a substituent represented by general formula (2) below, and n denotes an integer of 3 to 5, and (2)

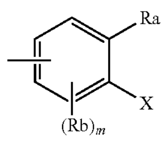

in general formula (2) above, Ra and Rb are each independently represented by a C1 to C12 alkyl, aryl, aralkyl, or cycloalkyl group, m denotes an integer of 0 to 3, and X represents a methacryloyloxy group.

2. The curable resin according to claim 1, wherein general formula (1) above is represented by general formula (1A) below, (1A)

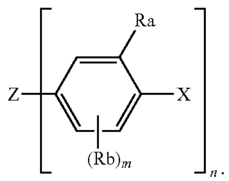

3. The curable resin according to claim 1, wherein the n is 4.

4. The curable resin according to claim 1, wherein the Z is an aliphatic hydrocarbon.

5. A curable resin composition comprising the curable resin according to claim 1, a radical polymerization initiator (B), and a flame retardant (C).

6. A curable resin composition comprising the curable resin according to claim 1, a radical polymerization initiator (B), and a flame retardant (C), and a curable resin (D) other than the curable resin according to claim 1.

7. The curable resin composition according to claim 5, wherein the (B) ingredient is an organic peroxide in a class of dialkyl peroxides.

8. The curable resin composition according to claim 5, wherein the (C) ingredient contains a phosphorus flame retardant represented by any of general formulae (P-1) to (P-5) below, (P-1)

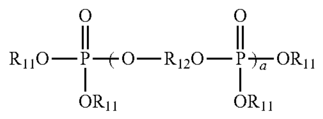

In general formula (P-1) above, the Riis each independently represent a C1 to C12 alkyl, aryl, aralkyl, or cycloalkyl group, $R_{12}$ represents an alkylene or arylene group, and a denotes an integer of 0 to 3;

(P-2)

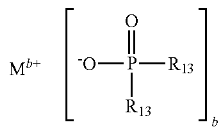

In general formula (P-2) above, the $R_{13}$s each independently represent a C1 to C12 alkyl, aryl, aralkyl, or cycloalkyl group, $M^{b+}$ represents a metal ion with a valency of b, and b denotes an integer of 1 to 3;

(P-3)

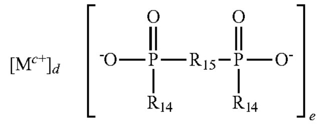

In general formula (P-3) above, the $R_{14}$s each independently represent a C1 to C12 alkyl, aryl, aralkyl, or cycloalkyl group, $R_{15}$ represents an alkylene or arylene group, $M^{c+}$ represents a metal ion with a valency of c, c, d, and e each independently denote an integer of 1 to 3, and c×d=2×e;

(P-4)

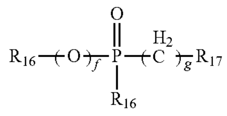

In general formula (P-4) above, the $R_{16}$s each independently represent a C1 to C12 alkyl, aryl, aralkyl, or cycloalkyl group, optionally forming a cyclic structure together with the phosphorus atom, $R_{17}$ represents a vinyl, vinylbenzyl, or (meth)acryloyloxy group, and f and g each independently denote 0 or 1;

(P-5)

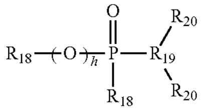

In general formula (P-5) above, the $R_{18}$s each independently represent a C1 to C12 alkyl, aryl, aralkyl, or cycloalkyl group, optionally forming a cyclic structure together with the phosphorus atom, $R_{19}$ represents a divalent group having an arylene structure, $R_{20}$ represents a (meth)acryloyloxy, vinylbenzyl ether, or allyl ether group, and h denotes 0 or 1.

9. The curable resin composition according to claim 6, wherein the (D) ingredient is at least one curable resin selected from the group consisting of epoxy resins, phenolic resins, active ester resins, cyanate ester resins, maleimide resins, benzoxazine resins, polyphenylene ether resins, and vinyl resins.

10. A cured product obtained by curing the curable resin composition according to claim 5.

11. A varnish that is a dilution of the curable resin composition according to claim 5 in an organic solvent.

12. A prepreg comprising a reinforcing base material and a half-cured form of the varnish according to claim 11 impregnated into the reinforcing base material.

13. A circuit board obtained by shaping a stack of the prepreg according to claim 12 and copper foil by thermocompression.

14. The curable resin composition according to claim 6, wherein the (B) ingredient is an organic peroxide in a class of dialkyl peroxides.

15. The curable resin composition according to claim 6, wherein the (C) ingredient contains a phosphorus flame retardant represented by any of general formulae (P-1) to (P-5) below, (P-1)

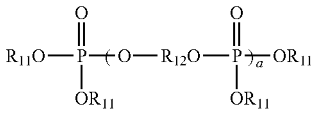

In general formula (P-1) above, the $R_{11}$s each independently represent a C1 to C12 alkyl, aryl, aralkyl, or cycloalkyl group, $R_{12}$ represents an alkylene or arylene group, and a denotes an integer of 0 to 3;

(P-2)

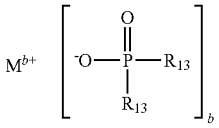

In general formula (P-2) above, the $R_{13}$s each independently represent a C1 to C12 alkyl, aryl, aralkyl, or cycloalkyl group, $M^{b+}$ represents a metal ion with a valency of b, and b denotes an integer of 1 to 3;

(P-3)

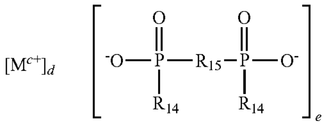

In general formula (P-3) above, the $R_{14}$s each independently represent a C1 to C12 alkyl, aryl, aralkyl, or cycloalkyl group, $R_{15}$ represents an alkylene or arylene group, $M^{c+}$ represents a metal ion with a valency of c, c, d, and e each independently denote an integer of 1 to 3, and c×d=2×e;

(P-4)

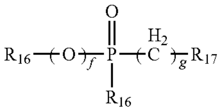

In general formula (P-4) above, the $R_{16}$s each independently represent a C1 to C12 alkyl, aryl, aralkyl, or cycloalkyl group, optionally forming a cyclic structure together with the phosphorus atom, $R_{17}$ represents a vinyl, vinylbenzyl, or (meth)acryloyloxy group, and f and g each independently denote 0 or 1;

(P-5)

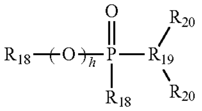

In general formula (P-5) above, the $R_{18}$s each independently represent a C1 to C12 alkyl, aryl, aralkyl, or cycloalkyl group, optionally forming a cyclic structure together with the phosphorus atom, $R_{19}$ represents a divalent group having an arylene structure, $R_{20}$ represents a (meth)acryloyloxy, vinylbenzyl ether, or allyl ether group, and h denotes 0 or 1.

16. A cured product obtained by curing the curable resin composition according to claim 6.

17. A varnish that is a dilution of the curable resin composition according to claim 6 in an organic solvent.

18. A prepreg comprising a reinforcing base material and a half-cured form of the varnish according to claim 17 impregnated into the reinforcing base material.

19. A circuit board obtained by shaping a stack of the prepreg according to claim 18 and copper foil by thermocompression.

* * * * *